United States Patent
Shimojo et al.

(10) Patent No.: US 11,113,787 B2
(45) Date of Patent: Sep. 7, 2021

(54) IMAGE DISTRIBUTION DEVICE, IMAGE DISTRIBUTION SYSTEM, IMAGE DISTRIBUTION METHOD, AND IMAGE DISTRIBUTION PROGRAM

(71) Applicant: AMATELUS INC., Tokyo (JP)

(72) Inventors: Shinya Shimojo, Tokyo (JP); Mitsuhide Matsuda, Tokyo (JP); Izuru Senokuchi, Tokyo (JP)

(73) Assignee: AMATELUS INC., Tokyo (JP)

( * ) Notice: Subject to any disclaimer, the term of this patent is extended or adjusted under 35 U.S.C. 154(b) by 0 days.

(21) Appl. No.: 16/649,357

(22) PCT Filed: Sep. 20, 2018

(86) PCT No.: PCT/JP2018/034937
§ 371 (c)(1),
(2) Date: Mar. 20, 2020

(87) PCT Pub. No.: WO2019/059325
PCT Pub. Date: Mar. 28, 2019

(65) Prior Publication Data
US 2020/0228754 A1    Jul. 16, 2020

(30) Foreign Application Priority Data
Sep. 20, 2017   (JP) .............................. JP2017-180411

(51) Int. Cl.
*G06T 7/20*    (2017.01)
*G06F 16/40*   (2019.01)
(Continued)

(52) U.S. Cl.
CPC ........ *G06T 3/4038* (2013.01); *G06F 3/04883* (2013.01); *G06F 16/40* (2019.01);
(Continued)

(58) Field of Classification Search
CPC ......... G06T 3/4038; G06T 7/20; G06F 16/40; G06F 3/04883; H04N 5/247
See application file for complete search history.

(56) References Cited

U.S. PATENT DOCUMENTS 6,233,428 B1    5/2001  Fryer
7,113,971 B1    9/2006  Ohi et al.
(Continued)

FOREIGN PATENT DOCUMENTS

CN    103765875 A1    4/2014
CN    104036536 A1    9/2014
(Continued)

OTHER PUBLICATIONS

WIPO Application No. PCT/JP2018/034937, International Search Report, dated Feb. 12, 2019.
(Continued)

Primary Examiner — Thai Q Tran
Assistant Examiner — Jose M Mesa
(74) Attorney, Agent, or Firm — Alston & Bird LLP

(57) ABSTRACT

By performing a simple operation on an information processing terminal, a direction of a subject desired to be viewed by a user 40 can be smoothly displayed from various directions. An acquisition unit that acquires a plurality of pieces of moving image data, a data generating unit that generates still image data for each of the plurality of pieces of moving image data, a storage unit that stores the still image data in association with position data and time data, a designated value accepting unit that accepts a position designation value in the still image data desired to be viewed by a user, and a selection unit that selects the still image data on the basis of the position designation value accepted by the designated value accepting unit and transmits the selected still image data to an external display device via a commu-
(Continued)

nication network are included, and the selection unit selects the still image data corresponding to the position designation value that has already been designated in a case in which the designated value accepting unit has not accepted the position designation value and selects the corresponding still image data on the basis of a change in the position designation value by using the time data as a reference in a case in which the designated value accepting unit has accepted the position designation value.

10 Claims, 16 Drawing Sheets

(51) Int. Cl.
| | | |
|---|---|---|
| *H04N 5/247* | (2006.01) | |
| *G06T 3/40* | (2006.01) | |
| *G06F 3/0488* | (2013.01) | |
| *H04N 7/18* | (2006.01) | |
| *G09B 5/06* | (2006.01) | |
| *G08B 13/196* | (2006.01) | |

(52) U.S. Cl.
CPC ............... *G06T 7/20* (2013.01); *H04N 5/247* (2013.01); *G06T 2207/10016* (2013.01); *G08B 13/19656* (2013.01); *G09B 5/065* (2013.01); *H04N 7/181* (2013.01)

(56) References Cited

U.S. PATENT DOCUMENTS

| | | | | |
|---|---|---|---|---|
| 8,115,814 B2* | 2/2012 | Iwase | ................ | H04N 5/23206 348/169 |
| 2005/0215336 A1* | 9/2005 | Ueda | ................ | A63B 24/0003 473/131 |
| 2014/0270706 A1 | 9/2014 | Pasko | | |
| 2017/0079607 A1 | 3/2017 | Claus et al. | | |
| 2018/0091704 A1 | 3/2018 | Koyama et al. | | |
| 2018/0225840 A1 | 8/2018 | Ikeda et al. | | |
| 2018/0343442 A1 | 11/2018 | Yoshikawa et al. | | |
| 2018/0352215 A1* | 12/2018 | Iwakiri | ................ | H04N 13/296 |

FOREIGN PATENT DOCUMENTS

| | | |
|---|---|---|
| JP | 2004-053616 A | 2/2004 |
| JP | 2015-005823 A | 1/2015 |
| JP | 2015-177394 A | 1/2015 |
| JP | 2016-517672 A | 6/2016 |
| JP | 2017-092826 A | 5/2017 |
| JP | 2017-139725 A | 8/2017 |
| WO | WO 2017/038541 A1 | 3/2017 |
| WO | WO 2016-208102 A1 | 5/2018 |

OTHER PUBLICATIONS

Yasuda, "Aiming for 'Democratization' of 3D-CG /VR-Interview with AMATELUS JAPAN Co., Ltd.," Amatelus Japan, 19 pages, (2017). [Retrieved from the Internet Jan. 28, 2019: <URL: https://www.sumoviva.jp/trend-tips/20170630_1356.html>].
"Demonstration experiment started in the world's first "SwipeVideo" web-based video project that allows users to experience 360-degree free-view video by swiping," PR Times, 4 pages, (2017). [Retrieved from the Internet Jan. 28, 2019: <URL: https://prtimes.jp/main.html/rd/p/000000002.000028108.html>]. [Author Unknown].
JP Application No. 2017-180411, Office Action dated Jun. 12, 2018.
JP Application No. 2019-512929, Office Action dated Apr. 23, 2019.
JP Application No. 2019-512929, Office Action dated Jun. 25, 2019.
JP Application No. 2019-143055, Office Action dated Dec. 24, 2019.
CN 201810438148.1 First Office Action dated Feb. 3, 2021.
JP 2019-143055 Decision of Refusal dated Jan. 19, 2021.
EP 18858483.3 Extended European Search Report dated May 3, 2021.
Wang, et al., "CamSwarm: Instantaneous Smartphone Camera Arrays for Collaborative Photography," XP055315707, Retrieved from the internet: pdfs.semanticsholar.org/4640/062d9afe3bcb817d9addbf63d0325024c29b.pdf (Jul. 4, 2015).

* cited by examiner

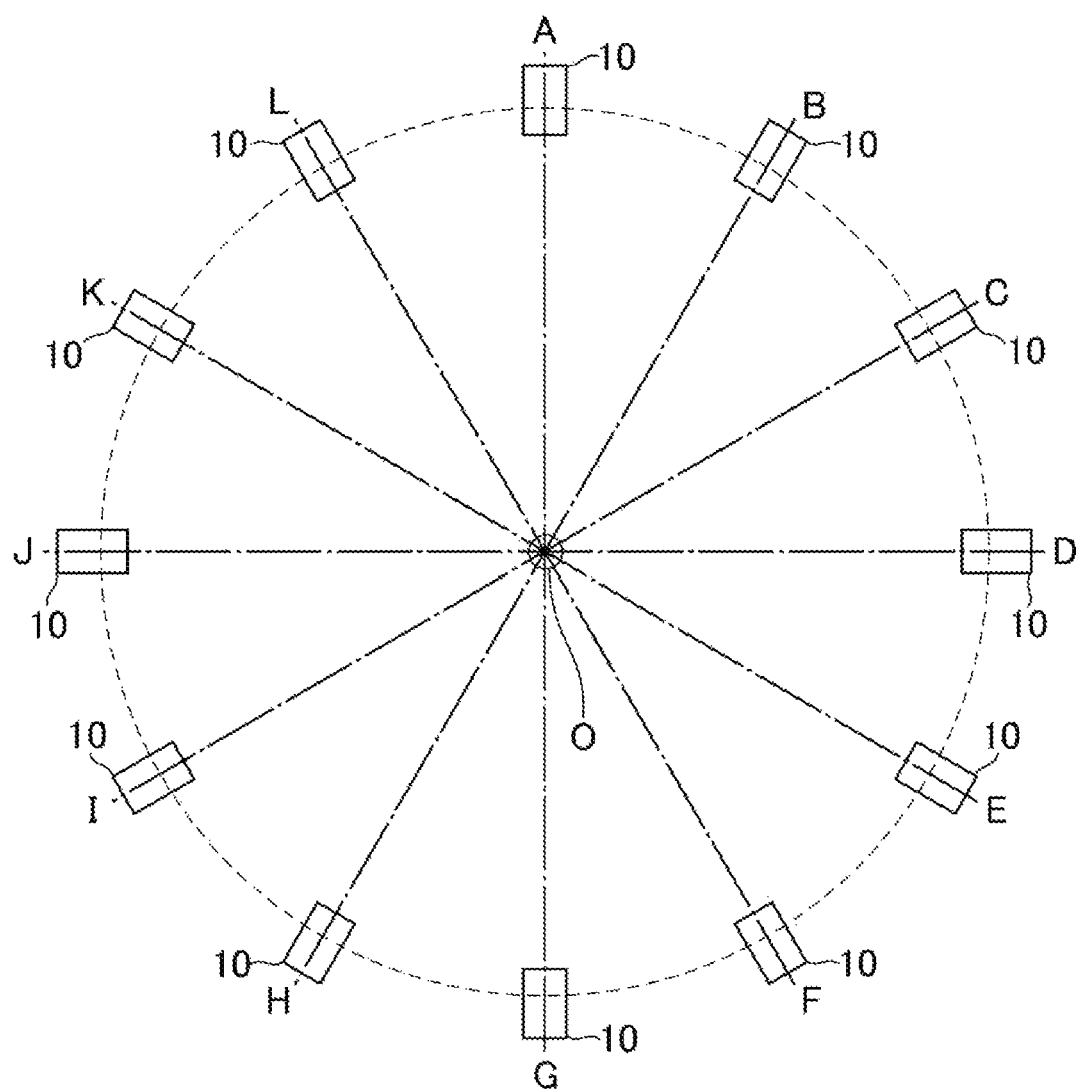

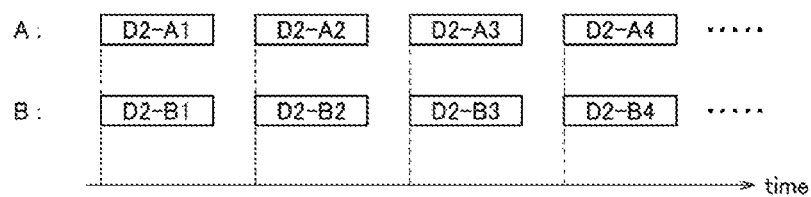
FIG. 14A
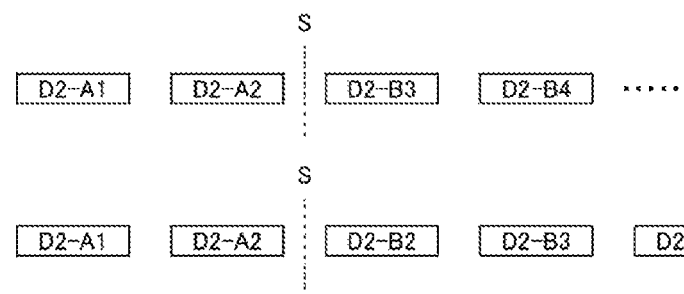
FIG. 14B
FIG. 14C

IMAGE DISTRIBUTION DEVICE, IMAGE
DISTRIBUTION SYSTEM, IMAGE
DISTRIBUTION METHOD, AND IMAGE
DISTRIBUTION PROGRAM

CROSS REFERENCE TO RELATED
APPLICATIONS

This application is a 371 National Stage Application of PCT/JP2018/034937, filed Sep. 20, 2018, which claims priority to Japanese application no. 2017-180411, filed Sep. 20, 2017, the contents of all of which are incorporated herein by reference in their entirety.

TECHNICAL FIELD

The present invention relates to an image distribution device, an image distribution system, an image distribution method, and an image distribution program, and more particularly, to an image distribution device, an image distribution system, an image distribution method, and an image distribution program using images captured by a plurality of cameras.

BACKGROUND ART

In recent years, video distribution devices using images captured by a plurality of cameras have been developed. For example, in Patent Literature 1, a configuration in which a point of view of a subject is changed using arrangement states of some cameras designated by a user in advance as a reference among a plurality of cameras having different points of view of the same subject is disclosed. It discloses that that one or two or more different cameras capturing images used for generating a series of combined moving images are designated as a group together with a camera designated by a user, and the combining order is determined for generating a series of combined moving images by changing and combining captured moving images of cameras inside this designated group at predetermined change timings.

In addition, in Patent Literature 2, an imaging system capable of capturing a plurality of images of a target object by disposing a plurality of imaging apparatuses in a three-dimensional space in which moving image signals of a subject are distributed from the plurality of cameras to a recording device with points of view thereof changed is described.

CITATION LIST

Patent Literature

[Patent Literature 1] Japanese Unexamined Patent Application Publication No. 2015-177394
[Patent Literature 2] Japanese Unexamined Patent Application Publication No. 2004-53616

SUMMARY OF INVENTION

Technical Problem

Here, in the inventions described in Patent Literatures 1 and 2, in a case in which moving images captured by a plurality of cameras undergo combination processing in each instance, there is a problem in that the amount of data becomes large, and a direction in which a subject is desired to be viewed cannot be designated by a user.

Thus, the present invention is realized with the problem described above taken into account, and an object thereof is to smoothly display a direction of a subject desired to be viewed by a user from various directions through a simple operation on an information processing terminal.

Solution to Problem

An image distribution device according to the present invention includes: an acquisition unit that acquires a plurality of pieces of moving image data imaged at different points; a data generating unit that generates still image data by extracting a frame for every predetermined time as a still image for each of the plurality of pieces of moving image data acquired by the acquisition unit; a storage unit that stores the still image data in association with position data representing an imaging position at which a subject has been imaged in each of the plurality of pieces of moving image data and time data representing a time at which the still image data has been imaged; a designated value accepting unit that accepts a position designation value for designating the position data in the still image data desired to be viewed by a user; and a selection unit that selects the still image data in accordance with the time data on the basis of the position designation value accepted by the designated value accepting unit and transmits the selected still image data to an external display device via a communication network, and the selection unit selects the still image data corresponding to the position designation value that has already been designated in a case in which the designated value accepting unit has not accepted the position designation value and selects the corresponding still image data on the basis of a change in the position designation value by using the time data of the still image data corresponding to a time at which the position designation value has been accepted as a reference in a case in which the designated value accepting unit has accepted the position designation value.

In addition, when the time data is used as a reference, the selection unit may initially select the still image data corresponding to the position data selected at that moment.

In addition, the acquisition unit acquires a plurality of pieces of moving image data acquired by imaging a subject from different directions, the position data is direction data representing information that can be used for specifying a direction in which the subject is imaged, and the designated value accepting unit may accept a direction designation value for designating the direction data in the still image data desired to be viewed by the user as the position designation value.

An image distribution system according to the present invention includes: the image distribution device described above; and a plurality of mobile terminals that are arranged to surround a subject, include cameras imaging the subject from different directions, have a function of recording moving images acquired through imaging, transmit the recorded moving images to a communication network, and configure a plurality of imaging units, and the acquisition unit acquires a plurality of the moving images acquired by the mobile terminals imaging the subject from the mobile terminals via the communication network.

In addition, the image distribution system according to the present invention may further include: an information processing terminal that includes a display monitor receiving and displaying the still image data transmitted from the image distribution device and an operation recognizing unit recognizing a motion of a finger of a user in front of the display monitor as a direction designating operation for selecting the direction designation value and recognizing an amount of movement of the finger of the user as the direction designation value and configures the display device, and the information processing terminal, by using the still image data received from the selection unit, may display the still image data of the subject at the direction designation value changing on the basis of the direction designating operation during the direction designating operation and display a pseudo moving image from a direction corresponding to a completion position by sequentially receiving and displaying the still image data having a direction designation value corresponding to the completion position of the direction designating operation in the order of a time series when the direction designating operation is not performing.

In addition, the operation recognizing unit may recognize a swiping operation in which a user slides a finger in a state in which the finger is brought into contact with a surface of the display monitor as the direction designating operation.

In addition, in a case in which the designated value accepting unit accepts the direction designation value, the selection unit may select the still image data such that the direction data is continuously connected in a case in which the amount of change in the direction designation value per unit time is smaller than a threshold and select the still image data such that the direction data is intermittently connected in a case in which the amount of change in the direction designation value per unit time is equal to or larger than the threshold.

In addition, the information processing terminal includes a requesting unit that makes a request to the selection unit for the still image data to be displayed on the display monitor on the basis of the direction designation value and a drawing unit that draws the still image data acquired by the requesting unit in the display motor using Hyper Text Markup Language (HTML) data, and a time TF in which the drawing unit draws the still image data on the display monitor may be shorter than a time TD in which the requesting unit acquires the still image data from the selection unit and transmits the acquired still image data to the drawing unit.

According to the present invention, there is provided an image distribution method causing a computer to execute: an acquisition step of acquiring a plurality of pieces of moving image data imaged at different points; a data generating step of generating still image data by extracting a frame for every predetermined time as a still image for each of the plurality of pieces of moving image data acquired in the acquisition step; a storage step of storing the still image data in association with position data representing an imaging position at which a subject has been imaged in each of the plurality of pieces of moving image data and time data representing a time at which the still image data has been imaged; a designated value accepting step of accepting a position designation value for designating a position at which the subject is viewed by a user; and a selection step of selecting the still image data in accordance with the time data on the basis of the position designation value accepted in the designated value accepting step and transmitting the selected still image data to an external display device via a communication network, and, in the selection step, the still image data corresponding to the position designation value that has already been designated is selected in a case in which the position designation value has not been accepted in the designated value accepting step, and the corresponding still image data is selected on the basis of a change in the position designation value by using the time data of the still image data corresponding to a time at which the position designation value has been accepted as a reference in a case in which the position designation value has been accepted in the designation value accepting step.

According to the present invention, there is provided an image distributing program causing a computer to implement: an acquisition function of acquiring a plurality of pieces of moving image data imaged at different points; a data generating function of generating still image data by extracting a frame for every predetermined time as a still image for each of the plurality of pieces of moving image data acquired by the acquisition function; a storage function of storing the still image data in association with position data representing an imaging position at which a subject has been imaged in each of the plurality of pieces of moving image data and time data representing a time at which the still image data has been imaged; a designated value accepting function of accepting a position designation value for designating a position at which the subject is viewed by a user; and a selection function of selecting the still image data in accordance with the time data on the basis of the position designation value accepted by the designated value accepting function and transmitting the selected still image data to an external display device via a communication network, and, in the selection function, the still image data corresponding to the position designation value that has already been designated is selected in a case in which the position designation value has not been accepted by the designated value accepting function, and the corresponding still image data is selected on the basis of a change in the position designation value by using the time data of the still image data corresponding to a time at which the position designation value has been accepted as a reference in a case in which the position designation value has been accepted by the designation value accepting function.

Advantageous Effects of Invention

According to the present invention, by accepting designation of a direction for viewing a subject from an information processing terminal, acquiring a still image corresponding to a direction every time when designation of the direction is accepted, and transmitting still images in the order of a time series in which the still images corresponding to the direction are stored to the information processing terminal, a direction of a subject desired to be viewed by a user can be smoothly displayed from various directions through a simple operation on the information processing terminal.

BRIEF DESCRIPTION OF DRAWINGS

FIG. 4 is a diagram illustrating an example of arrangement of a plurality of imaging units illustrated in FIG. 1.

FIG. 5A is a diagram illustrating a state in which still image data is stored, and FIG. 5B is a diagram in which still image data is aligned in a time series.

FIG. 14A to 14C each are a diagram illustrating switching of divided data.

DESCRIPTION OF EMBODIMENTS

Figure 1:
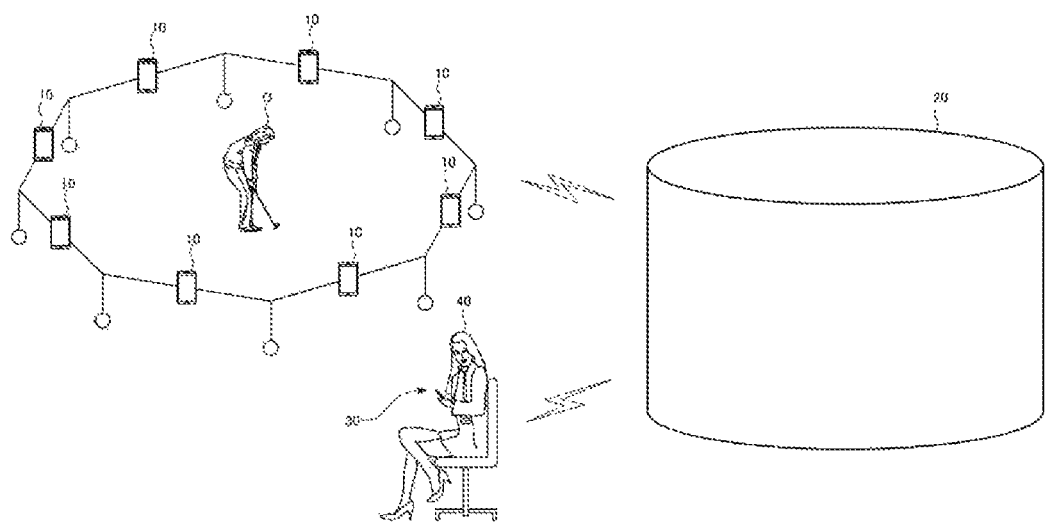
FIG. 1 is a diagram illustrating an example of the configuration of an image distribution system according to an embodiment of the present invention.

An embodiment of the present invention will be described with reference to the drawings. FIG. 1 is a diagram illustrating an example of the configuration of an image distribution system 1 according to an embodiment of the present invention. As illustrated in FIG. 1, the image distribution system 1 includes a plurality of mobile terminals 10 (imaging units) that are disposed to surround a subject O, an image distribution device 20 that distributes imaged data captured by the mobile terminal 10, and an information processing terminal 30 (a display device) including a display monitor 36 that displays an image supplied from the image distribution device 20.

The plurality of mobile terminals 10, the image distribution device 20, and the information processing terminal 30 are interconnected via a communication network. As the communication network, any one of various communication systems (for example, WiFi, 3G, LTE, and Bluetooth (registered trademark)) including wireless LAN may be used. The communication network may be a wired network.

The plurality of mobile terminals 10 include cameras imaging a subject O in different directions and have a function of recording a moving image acquired through imaging. The mobile terminal 10 can transmit a recorded moving image to the communication network. The camera includes an imaging device such as a CCD, a CMOS, or the like.

Although an example in which MPEG data is handled as moving image data, and JPEG data is handled as still image data is described in the following description, the formats of the moving image data and the still image data may be arbitrarily changed.

In this embodiment, so-called "bullet-time imaging" in which the plurality of mobile terminals 10 surround the subject O is performed. In the bullet-time imaging, many cameras are aligned on the periphery of the subject O, and the subject O is continuously imaged sequentially by the cameras in directions in which an angle is desired to be moved.

In this bullet-time imaging, by performing image processing, the movement of the subject O can be configured as a slow motion, or an image in which a camera work moves at a high speed can be captured. The image distribution device 20 may include an image processing unit (not illustrated) that is used for variable-speed reproduction. The image processing unit, for example, can perform slow reproduction and speed-up. Such an image processing unit may be included not in the image distribution device 20 but in the information processing terminal 30.

Next, the configuration of the image distribution device 20 will be described. The configuration of the image distribution device 20 described below is merely an example, and various changes can be made in a range in which necessary functions described below can be secured.

Figure 2:
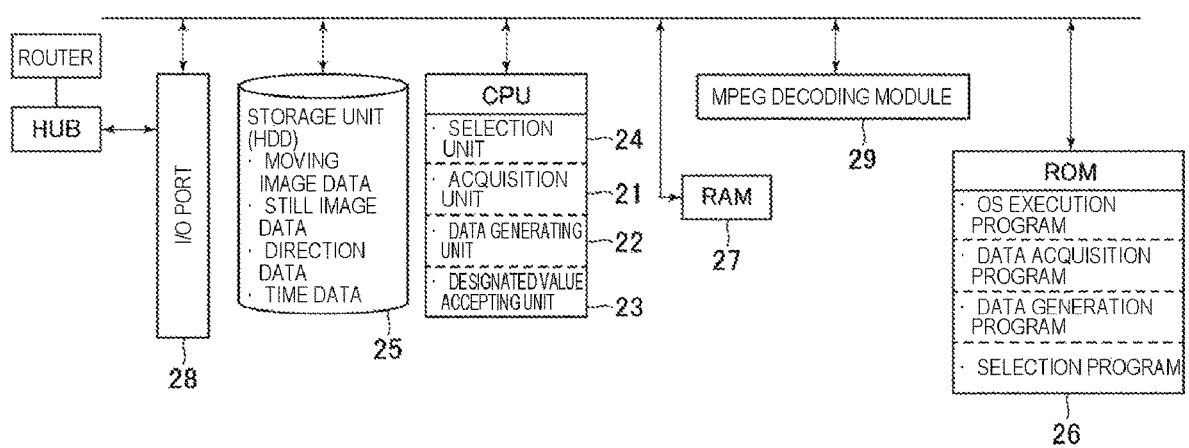
FIG. 2 is a configurational block diagram of an image distribution device illustrated in FIG. 1.

The image distribution device 20 is a device used for providing a service of the image distribution system 1 for the information processing terminal 30. The image distribution device 20, for example, is a so-called server apparatus or a computer (for example, a desktop computer, a laptop computer, a tablet, or the like). FIG. 2 is a configurational block diagram of the image distribution device 20.

As illustrated in FIG. 2, the image distribution device 20 includes an acquisition unit 21, a data generating unit 22, a designated value accepting unit 23, a selection unit 24, a storage unit 25, a ROM 26, a RAM 27, an IO port 28, a router, a HUB, and an MPEG decoding module 29.

The acquisition unit 21, the data generating unit 22, the designated value accepting unit 23, and the selection unit 24 represent a processor having a function of controlling each unit of the image distribution device 20, and in the illustrated example, are a central processing unit. The acquisition unit 21, the data generating unit 22, the designated value accepting unit 23, and the selection unit 24 may be a microprocessor, a processor core, a multiprocessor, an application-specific integrated circuit (ASIC), a field programmable gate array (FPGA), or the like.

The acquisition unit 21 acquires a plurality of pieces of moving image data imaged at different points through the I/O port 28. In this embodiment, the acquisition unit 21 acquires a plurality of pieces of moving image data acquired by imaging a subject O in mutually-different directions.

In other words, the acquisition unit 21 acquires a plurality of moving images, which have been acquired by the plurality of mobile terminals 10 imaging the subject O, from the mobile terminals 10 via a communication network. The moving images acquired by the acquisition unit 21 are stored in the storage unit 25.

When moving image data is acquired, the acquisition unit 21 executes a data acquisition program stored in the ROM 26.

The data generating unit 22 generates still image data by extracting a frame for each predetermined time as a still image for each of the plurality of pieces of moving image data acquired by the acquisition unit 21.

When still image data is generated, the data generating unit 22 executes a data generation program stored in the ROM 26. The data generation program decompresses moving image data stored in the storage unit 25 into a set of still image data using the MPEG decoding module 29 and stores the set of the data in the storage unit 25 again. At this time, each piece of the still image data is stored in association with time data representing an imaging timing. In generating still image data, some of the generated still image data may be stored in the RAM 27 as necessary.

The designated value accepting unit 23 accepts a position designation value used by a user 40 to designate position data in the still image data that is desired to be viewed. In this embodiment, the designated value accepting unit 23 accepts a direction designation value designating direction data that can be used for specifying a direction in which the subject O has been imaged in the still image data desired to be viewed by the user 40 as the position designation value.

Figure 10:
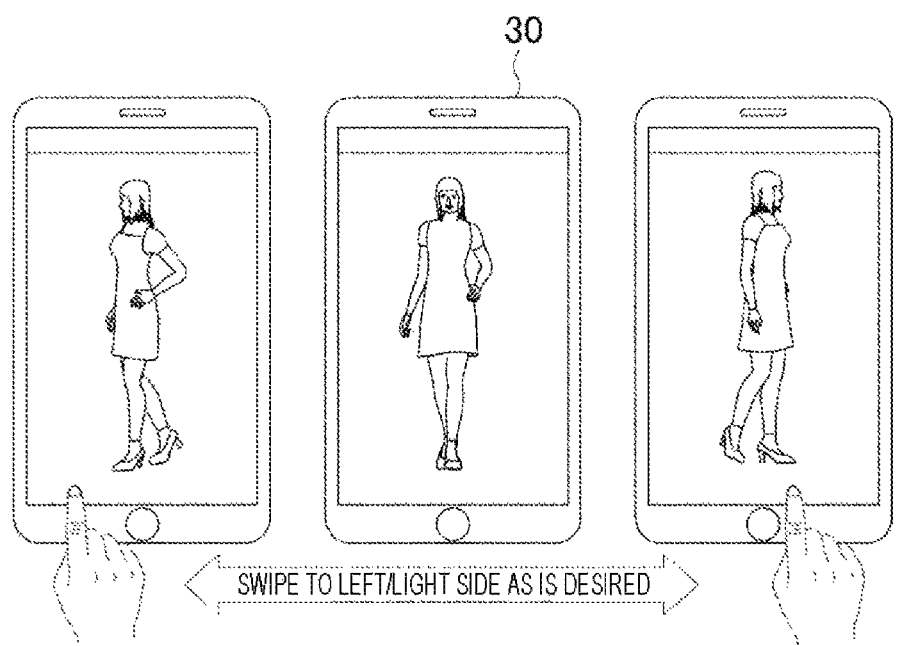
FIG. 10 is an explanatory diagram of simulated moving images that can be read by a user using the image distribution system illustrated in FIG. 1.

More specifically, in accordance with a screen operation such as an operation of sliding a finger in a state in which the finger is brought into contact with the screen of the display monitor 36 of the information processing terminal 30 to be described later, a so-called swiping operation or the like, as illustrated in FIG. 10, by being instructed whether the right side of the subject O is desired to be viewed or the left side thereof is desired to be viewed, the designated value accepting unit 23 accepts designation of a direction that is a direction among directions A to L (see FIG. 4) of the mobile terminals 10 in which the subject O is to be viewed. Here, FIG. 10 is an explanatory diagram of simulated moving images that can be viewed by a user.

For example, by performing a swiping operation in which a finger touching the screen slides from the left side to the right side of the screen, a direction in which a subject is viewed may be changed such that the right side of the subject is displayed. On the other hand, by performing a swiping operation in which a finger touching the screen slides from the right side to the left side of the screen, a direction in which a subject is viewed may be changed such that the left side of the subject is displayed. In other words, in such a case, the position of a user seeing a subject changes with respect to the subject in a direction in which the finger moves.

In addition, for example, by performing a swiping operation in which a finger touching the screen slides from the left side to the right side of the screen, the direction in which a subject is viewed may be changed such that the left side of the subject is displayed. On the other hand, by performing a swiping operation in which a finger touching the screen slides from the right side to the left side of the screen, the direction in which a subject is viewed may be changed such that the right side of the subject is displayed. In other words, in such a case, the subject is rotated in the direction in which a finger moves with respect to the user.

The viewing direction may be changed in accordance with a touch on the screen without performing a swiping operation. For example, the viewing direction may be changed in accordance with whether a part positioned on the right side with respect to the center in the horizontal direction is touched or a part positioned on the left side is touched on the screen.

In such a case, in a case in which a distance to a touching part from the center in the horizontal direction is short, the rotation angle of the screen may be decreased, and in a case in which a distance to a touching part from the center in the horizontal direction is short, rotation of the screen may be decreased.

The selection unit 24 illustrated in FIG. 2 selects still image data along time data on the basis of a direction designation value accepted by the designated value accepting unit 23 and transmits the selected still image data to the information processing terminal 30 that is an external display device via a communication network. In this embodiment, the information processing terminal 30 receives still image data and generates Hyper Text Markup Language (HTML) data. Here, the HTML data is data of a web page used for providing an image and represents data that can be distributed in the HTML form that can be used using a web browser.

The storage unit 25 stores various kinds of information of the image distribution device 20. The storage unit 25 stores still image data in association with position data representing an imaging position at which a subject O is imaged in each of a plurality of pieces of moving image data and time data representing a time at which the still image data is imaged. As the time data, time information may be stored, or a form in which a time stamp, in which a timing at which each still image is imaged is relatively represented, is stored may be employed.

In this embodiment, position data is direction data representing an imaging direction in which a subject O has been imaged.

In addition, the storage unit 25 may have a function for storing various programs and data that are necessary for the operation of the image distribution device 20. The storage unit 25, for example, is any one of various recording media such as a hard disk drive (HDD), a solid state drive (SSD), and a flash memory.

Next, the configuration of the information processing terminal 30 will be described. The configuration of the information processing terminal 30 described below is merely an example, and various changes can be made in a range in which necessary functions described below can be secured.

Figure 3:
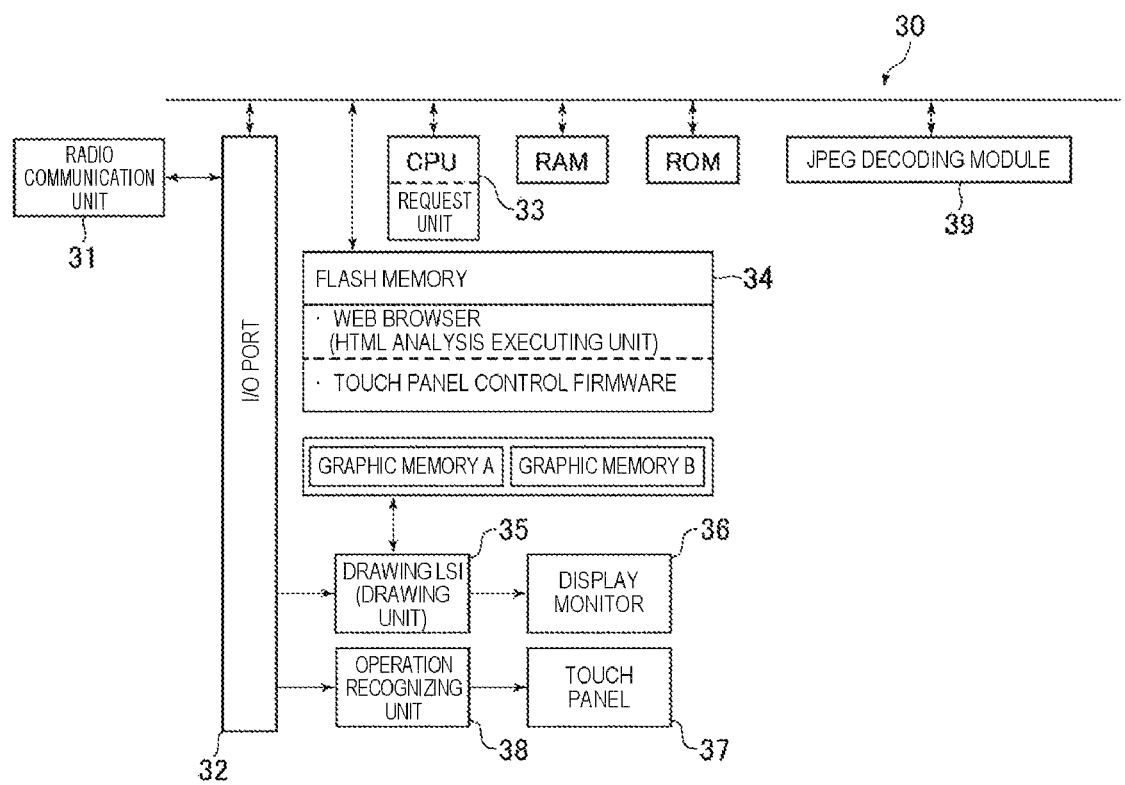
FIG. 3 is a configurational block diagram of an information processing terminal illustrated in FIG. 1.

The information processing terminal 30, for example, is a terminal device such as a smartphone or a tablet held by a user 40 and receives still image data transmitted from the selection unit 24 and displays the received still image data as HTML data. FIG. 3 is a configurational block diagram of the information processing terminal 30.

As illustrated in FIG. 3, the information processing terminal 30 includes a radio communication unit 31, an I/O port 32, a CPU 33, a RAM, a ROM, a flash memory 34, a graphic memory, a drawing LSI 35, a display monitor 36, a touch panel 37, an operation recognizing unit 38, and a JPEG decoding module 39.

The radio communication unit 31 transmits/receives data to/from the image distribution device 20 through the I/O port 32. The information processing terminal 30 may include a wired communication unit instead of the radio communication unit 31.

The flash memory 34 includes a web browser that generates HTML data from still image data transmitted from the image distribution device 20 and interprets and executes the generated HTML data and touch panel control firmware.

The CPU 33 functions as a requesting unit that makes a request to the image distribution device 20 for still image data to be displayed on the display monitor 36 on the basis of the direction designation value.

In addition, the CPU 33 sequentially changes details of the still image along a time series for a web page (HTML data) accessed from a web browser, thereby providing a pseudo moving image for the user 40. On this web page, as illustrated in FIG. 10, the user 40 views the subject O in a desired viewing direction on the display monitor of the information processing terminal 30.

When making a request to the image distribution device 20 for a still image, the requesting unit executes a control program stored in the flash memory. As a language used for the control program, JavaScript may be used.

By setting a frequency at which still image data is selected using a function in JavaScript, still image data can be acquired with high accuracy. As the language used for the control program, any language other than the JavaScript may be used.

For example, by executing a requesting program stored in a requesting memory of the ROM, the requesting unit makes a request to the image distribution device 20 for still image data. At this time, the requesting program specifies still image data corresponding to a viewing direction desired by the user 40 using a direction designation value that has been recognized by the operation recognizing unit 38 to be described below and has been stored in the RAM and transmits a request signal for requesting the specified still image data to the image distribution device 20.

The requesting unit decodes the still image data in the image distribution device 20 which is received from the image distribution device 20 using the JPEG decoding module 39 and transmits the decoded still image data to the drawing LSI 35.

The drawing LSI 35 functions as a drawing unit that displays still image data acquired by the requesting unit through the I/O port 32 on the display monitor 36 using HTML data. The drawing LSI 35 draws the still image data in a graphic memory, thereby displaying the still image data. In this embodiment, the information processing terminal 30 has two graphic memories A and B. In this description, the size of the still image data is preferably in the range of 15 to 120 KB and, more preferably, is in the range of 20 to 40 KB.

The touch panel 37 is disposed on a rear face of the display monitor 36. The touch panel 37 is a projection type of an electrostatic capacitance type and can detect contact of fingers of the user 40 at multiple points. The touch panel 37 calculates a speed and an acceleration of a finger using a change in position coordinates according to a motion of a finger of the user 40 and a time for which the finger has moved and can detect a displacement amount of the finger as an amount of change in the direction designation value. In accordance with this, the operation recognizing unit 38 recognizes an operation from the user 40.

The operation recognizing unit 38 recognizes a motion of a finger of the user 40 in front of the display monitor 36 as a direction designation value by recognizing it as a direction designating operation and stores the direction designation value in the RAM.

In this embodiment, the operation recognizing unit 38 recognizes a swiping operation in which the finger of the user 40 slides while in contact with the surface of the display monitor 36 as a direction designating operation.

In this embodiment, in a case in which a direction designation value has not been accepted, the selection unit 24 of the image distribution device 20 selects still image data corresponding to a direction designation value that has already been designated. In a case in which a direction designation value has been accepted, the selection unit 24, by using time data of still image data corresponding to a time when the direction designation value has been accepted as a reference, selects corresponding still image data on the basis of a change in the direction designation value.

Here, using time data of still image data corresponding to a time when the direction designation value has been accepted as a reference means selecting still image data corresponding to at least one of time data that is the same as that of the still image data and time data subsequent to the time data that has already been selected. This point will be described in detail with reference to FIGS. 4 to 6.

Figure 5A:
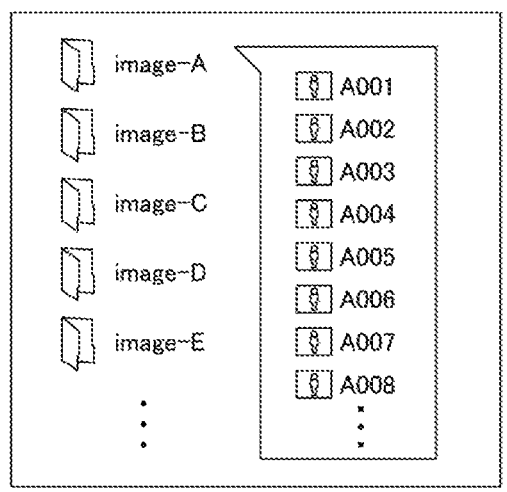
FIGS. 5A and 5B each are a schematic view of still image data stored in a storage unit illustrated in FIG. 1.
Figure 5B:
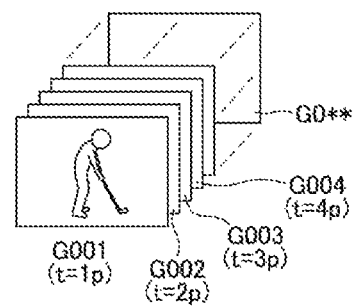
Figure 6:
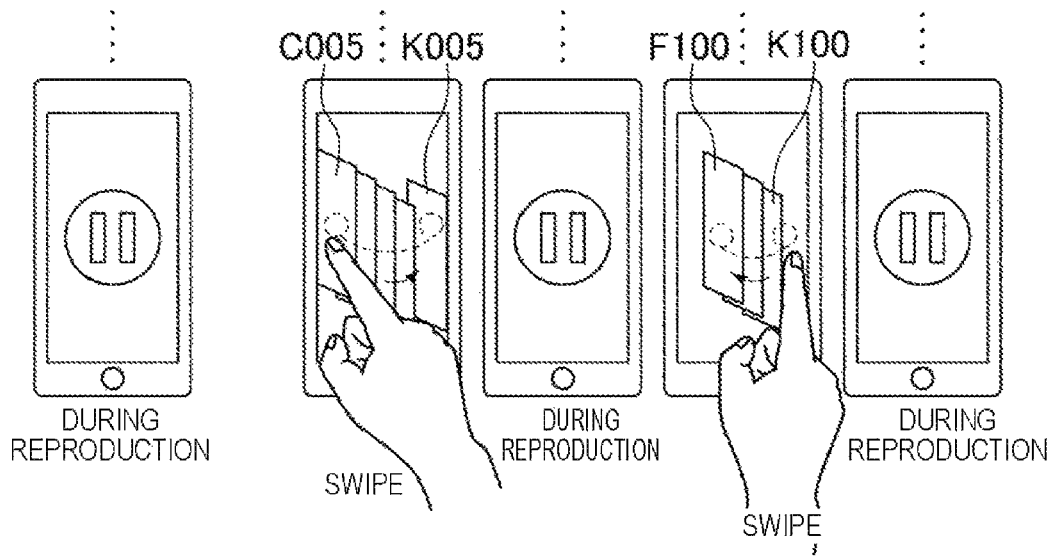
FIG. 6 is a schematic view illustrating a sequence of still image data displayed in the information processing terminal illustrated in FIG. 1.

FIG. 4 is a diagram illustrating an example of arrangement of a plurality of mobile terminals 10, FIGS. 5A and 5B each are a schematic view of still image data, FIG. 5A is a diagram illustrating a state in which still image data is stored, and FIG. 5B is a diagram in which still image data is aligned in a time series. FIG. 6 is a schematic view illustrating a sequence of still image data displayed in the information processing terminal 30.

FIG. 4 illustrates an example in which the plurality of mobile terminals 10 are arranged in a circumferential shape on a plane having the same height as a subject O. This arrangement example is merely an example, and the number and an arrangement interval of mobile terminals 10 may be arbitrarily changed.

Identification numbers A to L respectively used for identifying the mobile terminals 10 are assigned to the plurality of mobile terminals 10. By finding an identification number, a user can specify a direction in which a subject O is imaged. For this reason, in this embodiment, these identification numbers are handled as direction data to be designated by the information processing terminal 30 for the image distribution device 20.

As the direction data, coordinate information representing a position at which a mobile terminal 10 is disposed, information represented by an angle from a predetermined reference line passing through the subject O in a top view, or the like as well as the identification number of the mobile terminal 10 may be used as long as the information can be used for specifying a direction in which the subject O is imaged.

Next, as illustrated in FIG. 5A, data generated by the data generating unit 22 of the image distribution device 20 is stored inside a folder of each identification number along a time series of time data. In this description, a three-digit number following an identification number in a file name of each still image data becomes time data.

In this case, for example, when the number of frames of moving image data is 30 FPS, a frame pitch between adjacent pieces of still image data becomes about 0.033 seconds. As illustrated in FIG. 5B, by reproducing still image data along time data, a pseudo moving image can be acquired. It is preferable that the number of frames per second of the moving image data be about 24 to 30 FPS.

In a table illustrated in FIG. 6, the vertical axis represents an identification number as direction data, and the horizontal axis represents time data. In the table, file names of still image data corresponding to the vertical axis and the horizontal axis are aligned. In this table, transitions in the still image data displayed in the information processing terminal 30 in accordance with a user's operation illustrated below the table are illustrated. In other words, the table shows still image data corresponding to a cell through which an arrow denoted by a solid line passes displayed in the information processing terminal 30.

First, in a state in which still image data C001 is reproduced, moving images are sequentially reproduced in a time series.

In the process of the selection unit 24 selecting a still image, when the designated value accepting unit 23 accepts a direction designation value in accordance with a swiping operation of the user 40, as illustrated in the table of FIG. 6, the selection unit 24 selects corresponding still image data C005 to K005 on the basis of an amount of change in the direction designation value in the swiping operation using time data (t=5p) of still image data corresponding to a time when the direction designation value is accepted as a reference.

Here, when a time (t=5p) at which the direction designation value is accepted is used as a reference, the selection unit 24 initially selects still image data C005 corresponding to position data (direction data) selected at that moment. In this embodiment, in the process in which the direction designation value changes, the selection unit 24 sequentially selects still image data corresponding to the same time data one frame each time in order of identification numbers.

Then, when the direction designation value displays the still image data K005 designated in accordance with the swiping operation, a stop state occurs once. According to the user pressing a reproduction start button again, still image data corresponding to the direction designation value at that time continues to be reproduced. Instead of the stop state occurring once as described above, still image data corresponding to the direction designation value at that time may be continued to be reproduced continuously.

In addition, when the user performs a swiping operation again (t=100 p), as described above, in accordance with a change in the direction designation value, the selection unit 24 selects still image data corresponding to the same time data one frame each time in order of identification numbers (K100 to F100). Then, after the still image data F100 designated by the swiping operation is displayed, in a case in which the stop state does not occur once, still image data corresponding to the same direction designation value continues to be reproduced continuously. Although a form in which, by using time data (t=5p) of still image data corresponding to a time at which the selection unit 24 accepts a direction designation value as a reference, the selection unit 24 selects time data that is the same as that of the still image data has been described in the description presented above, the present invention is not limited to such a form.

In other words, in a video distribution device according to the present invention, as denoted by an arrow represented by a broken line, by using time data (t=5p) of still image data corresponding to a time at which the direction designation value has been accepted as a reference, the selection unit 24 may sequentially select time data subsequent to the time data that has already been selected. In such a case, a reproducing state can be maintained without the moving image being stopped even during swiping.

In a case in which the designated value accepting unit 23 has not accepted a direction designation value, an amount of change in the direction designation value per unit time is smaller than a threshold, the selection unit 24 selects still image data such that direction data is continuously connected.

On the other hand, in a case in which the amount of change in the direction designation value per unit time is equal to or larger than the threshold, the selection unit 24 selects still image data such that direction data is intermittently connected. Here, "intermittently" means that only a part of data is acquired for direction data that is continuously aligned.

In other words, in a case in which the operation recognizing unit 38 determines that the amount of operation according to a swiping operation is large in accordance with the user 40 moving a finger largely and quickly, still image data corresponding to direction data away from the original direction data can be acquired without acquisition of still image data corresponding to adjacent direction data. In accordance with this, for example, the user 40 can instantly check still image data acquired from the mobile terminal 10 of which the imaging direction is positioned on the opposite side.

In accordance with still image data received from the selection unit 24, the information processing terminal 30 displays still image data of the subject O for the direction designation value changing on the basis of a direction designating operation during the direction designating operation.

On the other hand, when a direction designating operation is not being performed, the information processing terminal 30 sequentially receives and displays still image data of a direction designation value corresponding to a completion position of the direction designating operation in order of a time series, thereby displaying a pseudo moving image from a direction corresponding to the completion position.

Figure 7:
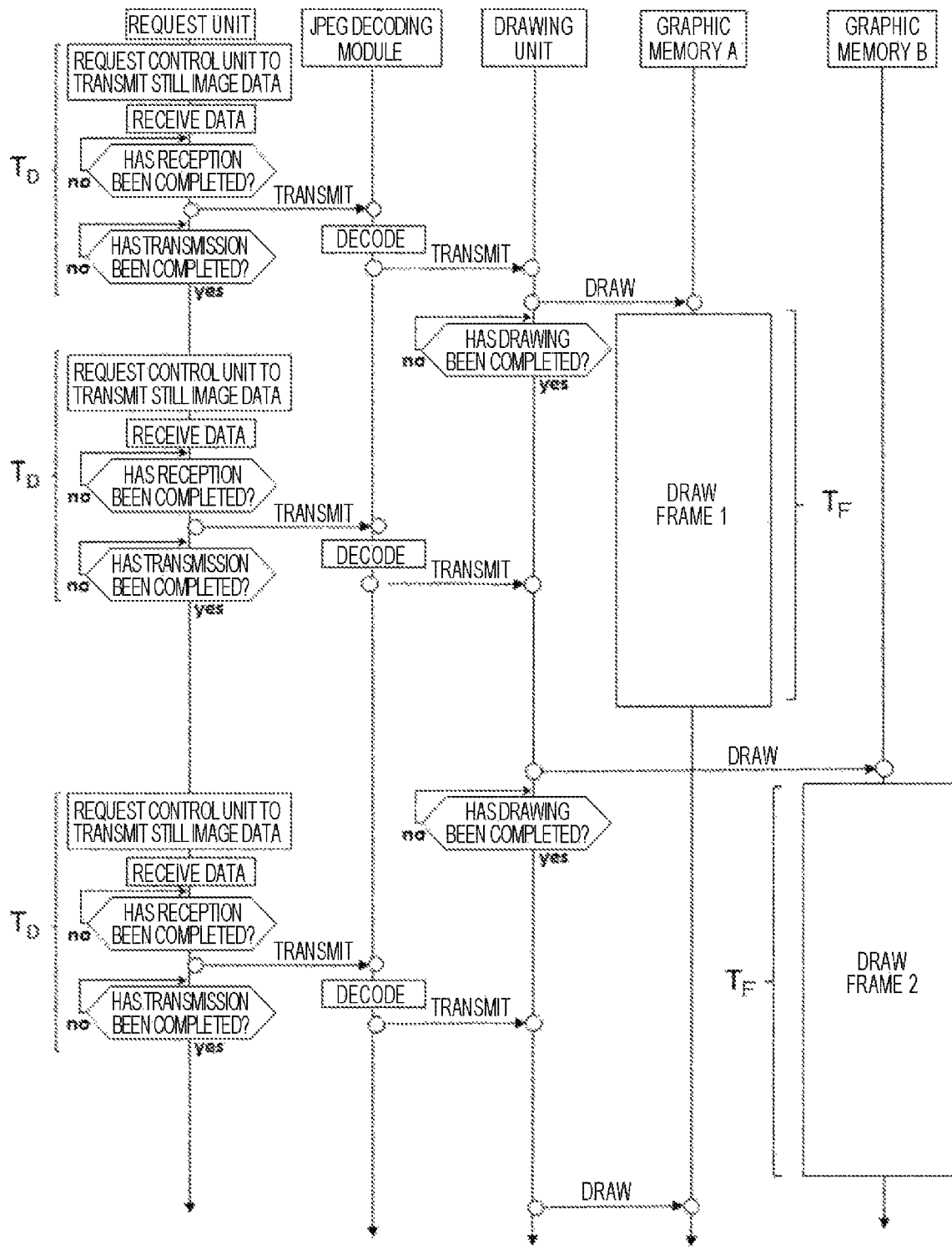
FIG. 7 is a sequence diagram illustrating a process inside the information processing terminal illustrated in FIG. 1.

Here, in the information processing terminal 30, a time TF in which the drawing unit draws still image data on the display monitor 36 is shorter than a time TD in which the requesting unit acquires still image data from the selection unit 24 and transmits the acquired still image data to the drawing unit. This point will be described with reference to FIG. 7. FIG. 7 is a sequence diagram illustrating a process inside the information processing terminal 30.

As illustrated in FIG. 7, when receiving still image data for which a request has been made to the selection unit 24, the requesting unit transmits the received still image data to the JPEG decoding module 39. Then, when decoding of the still image data is completed by the JPEG decoding module 39, the decoded still image data is transmitted to the drawing LSI 35 that is a drawing unit. Here, a time from the request for still image data according to the requesting unit to when the still image data is transmitted to the drawing unit will be denoted by TD.

Next, the drawing unit draws the still image data that has been transmitted thereto into a graphic memory. At this time, in this embodiment, the still image data is drawn by alternately using two graphic memories. When the drawing of the still image data into the graphic memories is completed, the still image data is displayed on the display monitor 36. Here, a time in which the drawing unit draws the still image data into the graphic memories will be denoted by TF.

In this embodiment, since TD is shorter than TF, a state in which the drawing unit always waits for the transmission of still image data to be drawn next when drawing using the drawing unit is completed can be realized. In this way, still image data can be smoothly reproduced.

Figure 8:
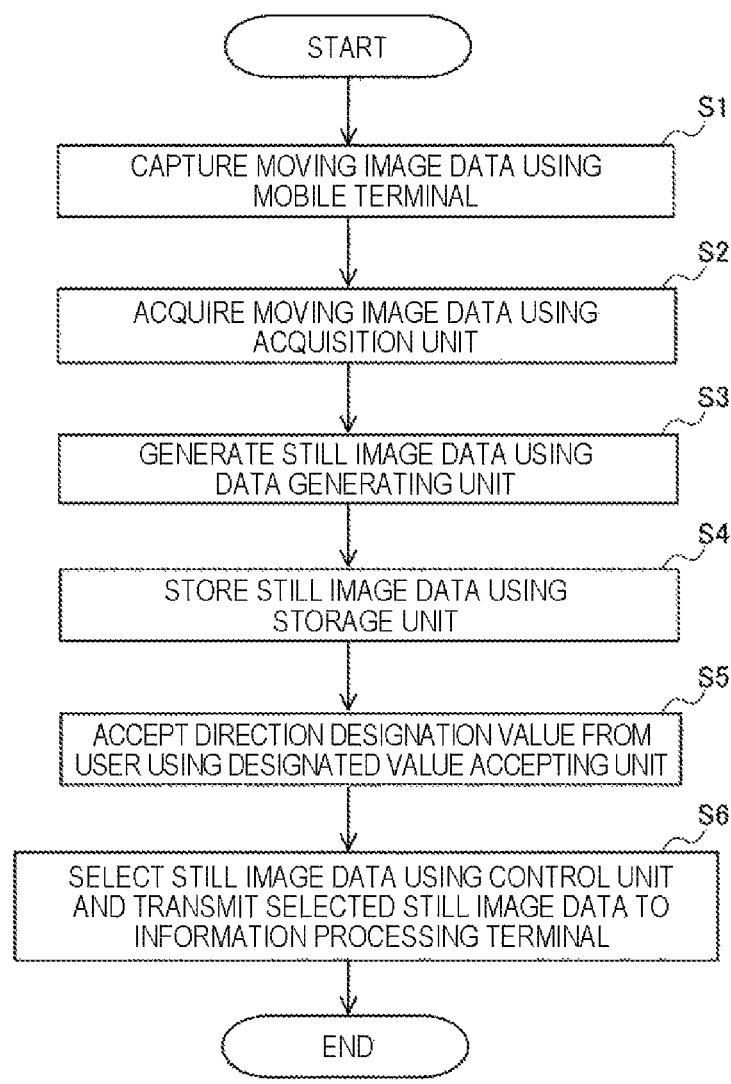
FIG. 8 is a control flow diagram of the image distribution device illustrated in FIG. 1.

Next, the processing sequence of the image distribution device 20 will be described with reference to FIG. 8. FIG. 8 is a control flow diagram of the image distribution device 20.

First, each of the plurality of mobile terminals 10 images moving image data (S1). Next, the acquisition unit 21 of the image distribution device 20 executes an acquisition step (S2) of acquiring a plurality of pieces of moving image data.

Next, a data generating step (S3) in which the data generating unit 22 generates still image data by extracting a frame of each predetermined time as a still image for each of the plurality of pieces of moving image data acquired by the acquisition unit 21 is executed.

Next, a storage step (S4) in which a CPU stores the still image data generated in the data generating step in association with position data and time data representing a time at which the still image data has been imaged is executed. The time data stored in the storage unit 25 may be acquired using a clock function built into the mobile terminal 10 or a clock function built into the image distribution device 20. Instead of using data representing a time, time data may be recorded through calculation using information of each imaging timing.

Next, a designated value accepting step (S5) in which a position designation value used by the user 40 for designating a position at which the subject O is to be viewed is accepted is executed.

Next, a selection step (S6) in which the selection unit 24 selects still image data on the basis of the position designation value accepted in the designation value accepting step and transmits the selected still image data to the information processing terminal 30 via a communication network is executed.

In the selection step, in a case in which a position designation value has not been accepted in the designation value accepting step, the still image data described above corresponding to the position designation value that has already been designated is selected. In a case in which a position designation value has been accepted in the designation value accepting step, by using time data of still image data corresponding to a time at which the position designation value has been accepted as a reference, the corresponding still image data described above is selected on the basis of a change in the position designation value.

Figure 9:
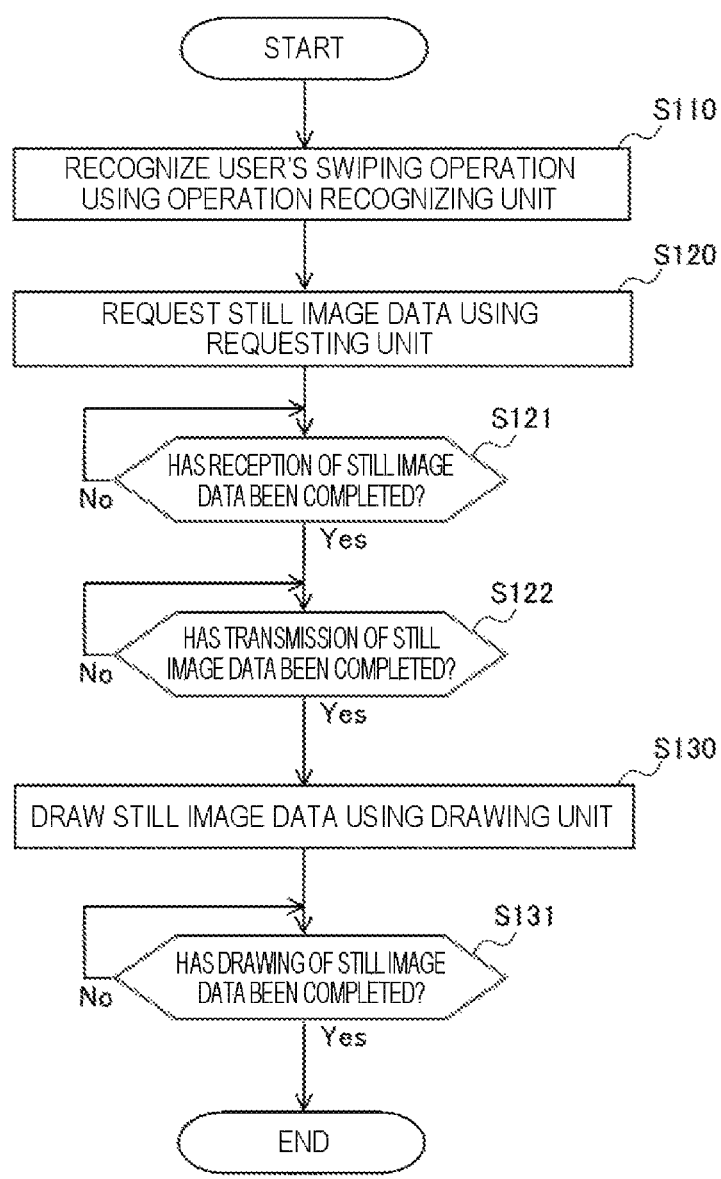
FIG. 9 is a control flow diagram of the information processing terminal illustrated in FIG. 1.

Next, the processing sequence of the information processing terminal 30 will be described with reference to FIG. 9. FIG. 9 is a control flow diagram of the information processing terminal 30.

First, the operation recognizing unit 38 of the information processing terminal 30 recognizes a user's swiping operation in an operation recognizing step (S110). The operation recognizing unit 38 specifies a direction designation value from the swiping operation.

Next, a requesting step (S120) in which the requesting unit makes a request to the image distribution device 20 for still image data is executed. In this requesting step, a request signal for requesting still image data specified by the operation recognizing unit 38 is transmitted to the image distribution device 20.

The requesting step corresponds to the designation value accepting step (S5 in FIG. 8) described above in the image distribution device 20.

Here, the requesting unit repeats this operation until the reception (download) of still image data is completed (No in S121). When the reception of a still image is completed (Yes in S121), the requesting unit decompresses the still image data using the JPEG decoding module and then transmits the decompressed still image data to the drawing unit. The requesting unit repeats this operation until the transmission of still image data to the drawing unit is completed (No in S122).

Finally, when the transmission of still image data to the drawing unit is completed (Yes in S122), the drawing unit draws still image data in a drawing step (S130). The drawing unit draws still image data by alternatively using two graphic memories. The drawing unit repeats the drawing operation until the drawing is completed (No in S131).

When the drawing operation according to the drawing unit is completed (Yes in S131), the user 40 can view the still image data acquired by imaging a subject O in a desired direction using the display monitor 36 of the information processing terminal 30 as a continuous pseudo moving image.

As described above, in the image distribution system 1 according to this embodiment, a direction designation value for viewing the subject O is accepted from the information processing terminal 30, and still image data corresponding to a direction is acquired and reproduced every time a direction designation value is accepted. For this reason, by performing a simple operation on the information processing terminal 30, a direction in which a subject O is desired to be viewed by the user 40 can be smoothly displayed from various direction angles.

In addition, when a still image is selected using time data as a reference, the selection unit 24 initially selects still image data corresponding to position data selected at that moment. For this reason, by inhibiting an abrupt change in the direction in which a subject is viewed, a pseudo moving image can be formed as a natural moving image that is continuously connected.

In addition, by continuously transmitting only still image data corresponding to one imaging unit in accordance with a swiping operation on the screen of the information processing terminal 30, a fee for data communication between the image distribution device 20 and the information processing terminal 30 can be reduced. In accordance with this, for example, in a case in which there is a limit on the communication capacity of a communication network between the image distribution device 20 and the information processing terminal 30, for example, the capacity of each piece of still image data can be configured to be larger than that in a configuration in which still image data of each of a plurality of imaging units is simultaneously transmitted, and a pseudo moving image to be reproduced by the information processing terminal 30 can be configured to have high resolution.

In addition, the imaging unit has a moving image recording function, and the mobile terminal 10 can transmit recorded moving image data to a communication network. Accordingly, it is possible to easily exchange data between the imaging unit and the image distribution device 20 via the communication network.

Furthermore, since a direction designating operation can be performed using a simple operation of performing a swiping operation on the screen of the display monitor 36, the user 40 can designate a direction in which the subject O is desired to be viewed in a pseudo moving image by performing an intuitively simple operation.

In addition, in a case in which the user 40 performs a large swiping operation or the like, the selection unit 24 intermittently selects still image data, and accordingly, the amount of data transmitted to the information processing terminal 30 can be configured to be smaller than that of a case in which the selection unit 24 continuously selects still image data.

In accordance with this, even in a case in which the amount of operation in the direction designating operation of the user 40 becomes large, and the number of pieces of direction data to be aligned in correspondence with the amount of operation becomes large, an increase in the amount of communication data between the image distribution device 20 and the information processing terminal 30 can be reliably inhibited.

While an embodiment of the present invention has been described above with reference to the drawings, a specific configuration is not limited to this embodiment.

For example, although a configuration in which the imaging unit is a camera included in the mobile terminal 10 has been illustrated in the embodiment described above, the present invention is not limited to such a form, and a single-lens reflex camera, a digital camera, or the like may be used as the imaging unit.

In addition, although a configuration in which the information processing terminal 30 generates HTML data using still image data transmitted from the image distribution device 20 has been illustrated in the embodiment described above, the present invention is not limited to such a form. The image distribution device 20 may form still image data as HTML data and transmit the HTML data to the information processing terminal 30.

In addition, although the configuration of bullet-time imaging using a plurality of imaging units has been illustrated in the embodiment described above, the present invention is not limited to such a form. For example, moving images such as scenes imaged at a plurality of positions may be used.

Furthermore, although a configuration in which a plurality of mobile terminals 10 are arranged in a circumferential shape on a plane having the same height with respect to a subject O has been illustrated in the bullet-time imaging according to the embodiment described above, the present invention is not limited to such a form. It may be configured such that planes are set at a plurality of heights, a camera group is configured at a plane of each of the heights, and the selection unit 24 selects still image data over the camera groups. In accordance with this, a direction in which the subject O is viewed can be three-dimensionally selected.

In addition, an imaging target for the imaging unit, for example, may be a working person or an animal other than a person instead of a person enjoying a sport as illustrated in FIG. 1 or may be an entire stadium, an entertainer, a concert of a singer, or the like. Furthermore, although the image distribution system 1 may also be used for a landscape, it is basically effective for a moving object such as a person, an animal, or the like. The reason for this is that this image distribution system 1 can provide a pseudo moving image such as a 360-degrees moving image, and accordingly it is effective for a dynamic subject O.

In addition, the information processing terminal 30 can designate a different direction not only through a swiping operation but using a trajectory of a finger. In other words, the user 40 can input an operation command by moving a finger in front of the screen without bringing the finger into contact with the display monitor 36 of the information processing terminal 30. In this case, for example, the operation recognizing unit 38 may be realized by additionally installing firmware that images the front side of the display monitor 36 and converts a motion of a finger into coordinates in the information processing terminal 30.

In addition, although a configuration in which the selection unit 24 selects still image data of one frame corresponding to corresponding time data in order of identification numbers while the designated value accepting unit 23 accepts a direction designation value, in other words, in the process in which the direction designation value changes has been illustrated in this embodiment, the present invention is not limited to such a form.

For example, in the process in which the direction designation value changes, the selection unit 24 may select still image data corresponding to corresponding time data and still image data following the still image data that correspond to a plurality of frames corresponding to an arbitrary number. In such a case, still image data corresponding to the plurality of frames corresponding to the arbitrary number may be handled as one file.

In addition, although a configuration in which, in a case in which the designated value accepting unit 23 accepts a direction designation value and the amount of change in the direction designation value per unit time is equal to or larger than a threshold, the selection unit 24 selects still image data such that direction data is intermittently connected has been illustrated in the embodiment described above, the present invention is not limited to such a form.

That is, the process of intermittently selecting still image data may be performed on the information processing terminal 30 side instead of the image distribution device 20 side.

In such a case, for example, a configuration in which the requesting unit intermittently makes a request to the selection unit 24 for still image data to be displayed on the display monitor 36 in a case in which the amount of operation in the direction designating operation recognized by the operation recognizing unit 38 in the information processing terminal 30 is equal to or larger than a threshold may be employed.

In addition, each functional unit of the image distribution system 1 may be realized using logical circuits (hardware) or a dedicated circuit formed in an integrated circuit (IC) chip, a large scale integration (LSI), or the like or may be realized by software using the central processing unit (CPU) and a memory. In addition, each functional unit may be realized by one or a plurality of integrated circuits, and the functions of a plurality of functional units may be realized by one integrated circuit. The LSI may be referred to as a VLSI, a super LSI, an ultra LSI, or the like depending on a difference in the degree of integration.

Next, a moving image distribution system (an image distribution system) 100 according to an embodiment of the present invention will be described.

Figure 11:
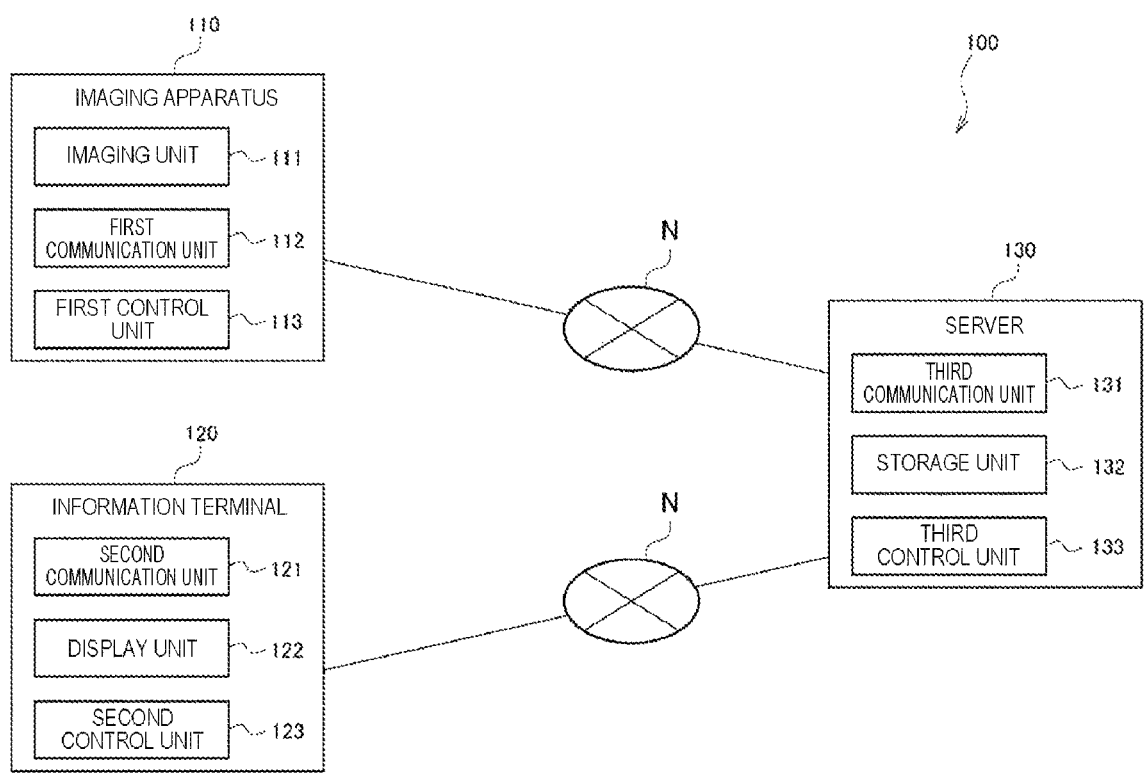
FIG. 11 is a diagram illustrating an example of the configuration of a moving image distribution system.

FIG. 11 is a diagram illustrating an example of the configuration of the moving image distribution system 100.

The moving image distribution system 100 includes a plurality of imaging apparatuses 110, a server 130 as an example of a moving image distribution device, and an information terminal 120.

The plurality of imaging apparatuses 110, the server 130, and the information terminal 120 are interconnected via a communication network N.

The imaging apparatus 110 generates moving image data by imaging a subject. As one example, the imaging apparatus 110 is a smartphone, a tablet terminal, a camera, a video camera, or the like.

As a specific configuration example, the imaging apparatus 110 includes an imaging unit 111, a first communication unit 112, and a first control unit 113.

The imaging unit 111 includes a lens, an image sensor, and the like for generating moving image data by imaging a subject.

The first communication unit 112 transmits moving image data generated by the imaging unit 111 to the server 130.

The first control unit 113 controls the imaging unit 111 and the first communication unit 112. The first control unit 113 performs image processing for moving image data generated by the imaging unit 111 as appropriate. In this imaging process, as one example, a process of adding data of an imaging time to the moving image data may be included. In addition, in the image processing, as one example, a process of adding identification data used for identifying the imaging apparatus 110 to the moving image data may be included.

As described above, there are the plurality of imaging apparatuses 110, and the imaging apparatuses 110 are arranged such that a subject is imaged at different angles. It is preferable that subjects imaged by the plurality of imaging apparatuses 110 be the same.

Figure 12A:
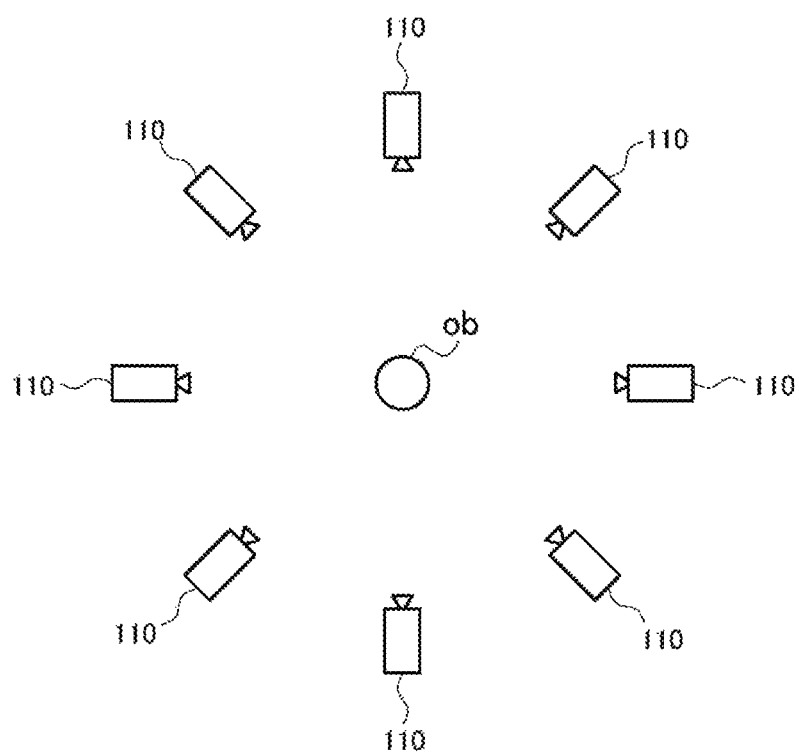
FIGS. 12A and 12B each are a diagram illustrating the arrangement of a plurality of imaging apparatuses.
Figure 12B:
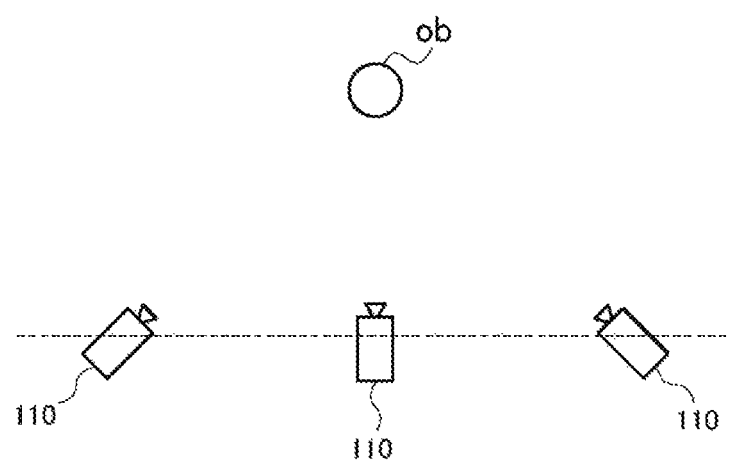

FIGS. 12A and 12B each are a diagram illustrating the arrangement of the plurality of imaging apparatuses 110. Here, FIG. 12A is a diagram illustrating a first arrangement example, and FIG. 12B is a diagram illustrating a second arrangement example.

As illustrated in FIG. 12A, the plurality of imaging apparatuses 110 are arranged to surround a subject ob. Alternatively, as illustrated in FIG. 12B, the plurality of imaging apparatuses 110 are arranged in one row. The arrangement of the plurality of imaging apparatuses 110 is not limited to the example illustrated in each of FIGS. 12A and 12B.

The information terminal 120 illustrated in FIG. 11 performs display on the basis of divided data transmitted from the server 130. As one example, the information terminal 120 is a smartphone, a tablet terminal, a personal computer, or the like.

As a specific configuration example, the information terminal 120 includes a second communication unit 121, a display unit 122, and a second control unit 123.

The second communication unit 121 receives divided data transmitted from the server 130. The second communication unit 121 transmits data transmission request information, switching request information, and transmission stop request information to the server 130.

The data transmission request information is an information signal for requesting the server 130 to transmit divided data to the information terminal 120.

The switching request information is an information signal for requesting to switch divided data based on moving image data generated by one imaging apparatus 110, which is transmitted from the server 130 to the information terminal 120, into other divided data based on other moving image data generated by imaging apparatuses 110 other than the one imaging apparatus 110 and to transmit the other divided data from the server 130 to the information terminal 120.

The transmission stop request information is an information signal for requesting to stop the transmission of divided data transmitted from the server 130 to the information terminal 120.

The display unit 122 displays a moving image or the like as one example. In addition, the display unit 122 may have a function for inputting information like a touch panel or the like. In a case in which the display unit 122 does not have the input function, an input unit that can input information is disposed in the information terminal 120.

The second control unit 123 controls the second communication unit 121 and the display unit 122. As one example, in a case in which divided data is received by the second communication unit 121, the second control unit 123 causes the display unit 122 to display a moving image based on the divided data. In addition, for example, in a case in which information is input through the display unit 122, the second control unit 123 generates data transmission request information, switching request information, or transmission stop request information based on the information and performs control of the second communication unit 121 such that it transmits the data transmission request information, the switching request information, or the stop request information that has been generated.

The server 130 includes a third communication unit 131, a storage unit 132, and a third control unit 133.

The third communication unit 131 communicates with the plurality of imaging apparatuses 110 and the information terminal 120 via the communication network N. The third communication unit 131 receives moving image data transmitted from each of the plurality of imaging apparatuses 110. The third communication unit 131 receives data transmission request information, switching request information, and transmission stop request information transmitted from the information terminal 120. The third communication unit 131 transmits divided data stored in the storage unit 132 to the information terminal 120.

The storage unit 132 stores data. More specifically, in the storage unit 132, a plurality of pieces of moving image data acquired by imaging a subject at different angles are stored in units of divided data divided into one or more frames, for example, in order of a time series. In other words, the moving image data is arranged as divided data in units of an arbitrary number of seconds. For example, information of a reproduction sequence such as a time stamp may be assigned to the divided data. In addition, for example, the divided data (frame) may be recorded as alignment of image files or in a moving image format such as a fragmented mp4 or MPEG2-ts format. The storage unit 132 sores programs and various kinds of data used by the server 130. The storage unit 132 is any of various recording media such as a hard disk, a memory, or the like.

The third control unit 133 causes the storage unit 132 to store a plurality of pieces of moving image data received by the second reception unit in units of divided data acquiring by dividing the moving image data into one or more frames in the order of a time series. More specifically, the third control unit 133 performs a process of dividing each of a plurality of pieces of moving image data received by the third communication unit 131 for every predetermined number of frames. As one example, the predetermined number of frames is one or more frames. The divided data divided into a predetermined number of frames is stored in the storage unit 132 in units of this divided data.

Figure 13A:
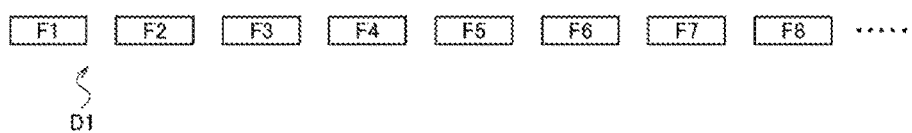
FIGS. 13A to 13D each are a diagram illustrating moving image data and divided data.
Figure 13B:
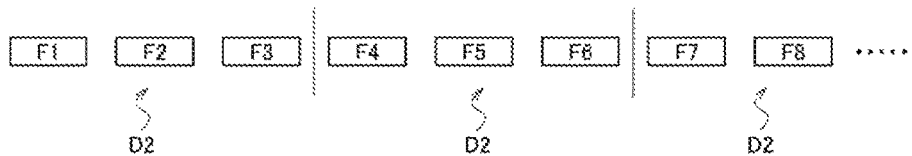
Figure 13C:
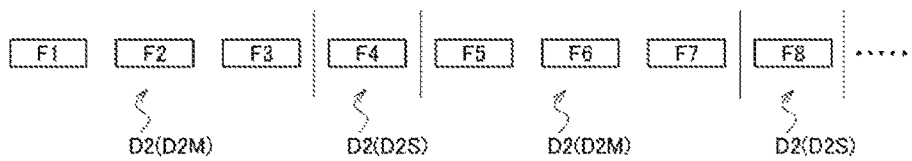
Figure 13D:
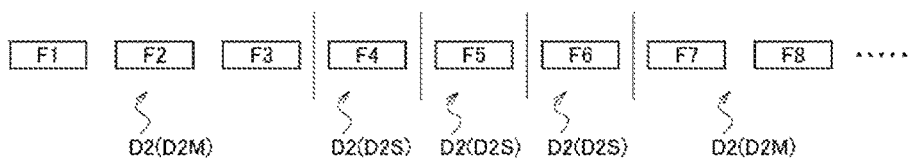

FIGS. 13A to 13D each are a diagram illustrating moving image data and divided data. Here, FIG. 13A is a diagram illustrating moving image data, FIG. 13B is a diagram illustrating a first example of the divided data, FIG. 13C is a diagram illustrating a second example of the divided data, and FIG. 13D is a diagram illustrating a third example of the divided data.

As illustrated in FIG. 13A, the moving image data D1 is composed of a plurality of frames F1, F2, F3, . . . .

The third control unit 133 may divide moving image data for every plurality of frames and store the moving image data in the storage unit 132 in units of divided data in the storage unit 132. As illustrated in FIG. 13B as one example, by dividing the moving image data for every three frames, a plurality of frames of the moving image data are sequentially divided into divided data D2 divided into the frames F1 to F3 and divided data D2 divided into the frames F4 to F6.

In addition, the third control unit 133 may divide moving image data into a plurality of frames and one frame and store the moving image data in the storage unit 132 in units of divided data. In such a case, the divided data is composed of a multiple-frame divided data composed of a plurality of frames and a single-frame divided data composed of one frame. In other words, the divided data is configured such that a multiple-frame divided data and a single-frame divided data are alternately arranged in a time series. A frame configuring the single-frame divided data may be the same as a last frame in a time series configuring previous multiple-frame divided data or a first frame in a time series configuring a next multiple-frame divided data.

As illustrated in FIG. 13C as one example, a plurality of frames of moving image data are sequentially divided into divided data D2 (multiple-frame divided data D2M) divided into frames F1 to F3, divided data D2 (single-frame divided data D2S) divided into a frame F4, divided data D2 (multiple-frame divided data D2M) divided into frames F5 to F7, and divided data D2 (single-frame divided data D2S) divided into a frame F8. In this case, the frame F4 may be the same as one of the frame F3 and the frame F5. Similarly, the frame F8 may be the same as one of the frame F7 and a frame F9 (not illustrated).

In addition, the third control unit 133 may delete a frame configuring single-frame divided data. For example, in a case in which there is a transmission stop request as will be described below, the third control unit 133 transmits single-frame divided data. The third control unit 133 may store log information relating to transmitted single-frame divided data (a frame), analyze the log information for every predetermined period, and, in a case in which a frequency in use of the single-frame divided data is lower than a threshold, delete the single-frame divided data (a frame) having a low frequency in use.

In addition, there may be a plurality of pieces of single-frame divided data that are continuous in a time series. The divided data is configured such that one piece of multiple-frame divided data and a plurality of pieces of single-frame divided data are alternately arranged in a time series. A frame configuring first single-frame divided data in a time series among a plurality of pieces of single-frame divided data that are continuous may be the same as a last frame in a time series configuring the previous multiple-frame divided data. In addition, a frame configuring a last single-frame divided data in a time series among a plurality of pieces of single-frame divided data that are continuous may be the same as a first frame in a time series configuring next multiple-frame divided data.

As illustrated in FIG. 13D as one example, a plurality of frames of moving image data are sequentially divided into divided data D2 (multiple-frame divided data D2M) divided into frames F1 to F3, divided data D2 (single-frame divided data D2S) divided into a frame F4, divided data D2 (single-frame divided data D2S) divided into a frame F5, divided data D2 (single-frame divided data D2S) divided into a frame F6, and divided data D2 (multiple-frame divided data D2M) divided into frames F7 to F9 (the frame F9 is not illustrated). In this case, the frames F4 to F6 may be respectively the same as the frames F1 to F3 or the frames F7 to F9 (the frame F9 is not illustrated in FIG. 13D).

Here, similar to the description presented in the example illustrated in FIG. 13C, the third control unit 133 may delete single-frame divided data (a frame) having a low frequency in use.

In a case in which identification data is added to moving image data by the imaging apparatus 110, the third control unit 133 stores the moving image data in the storage unit 132 in association with the identification data (the imaging apparatus 110). In a case in which data in which a position relation of a plurality of imaging apparatuses 110 is set is stored in the storage unit 132 of the server 130, the third control unit 133 can identify also the moving image data stored in the storage unit 132 to be moving image data imaged by a certain imaging apparatus 110 (at a certain position).

The third control unit 133 performs control such that divided data is read from the storage unit 132 on the basis of data transmission request information received by the third communication unit 131. For example, in a case in which one of the plurality of pieces of divided data is requested to be transmitted in accordance with data transmission request information, the third control unit 133 performs control such that the requested divided data is read from the storage unit 132. The third control unit 133 performs control of the third communication unit 131 such that the read divided data is transmitted to the external information terminal 120.

The data transmission request information is an information signal for requesting the server 130 to transmit divided data to the information terminal 120.

In a case in which the data transmission request information has been received by the third communication unit 131, the third control unit 133 performs control such that moving image data generated by one imaging apparatus 110 among the plurality of imaging apparatuses 110 is read from the storage unit 132 in units of divided data. The divided data to be read is divided data based on the moving image data generated by the imaging apparatus 110 set in advance. Alternatively, in a case in which the imaging apparatus 110 is selected in the information terminal 120, and the selected information is added to the data transmission request information, the divided data to be read is divided data based on the moving image data generated by the selected imaging apparatus 110. In addition, in a case in which a time such as an imaging time or a reproduction time is designated in the information terminal 120, and information of the time designation is added to the data transmission request information, the divided data to be read is divided data to which time information corresponding to the time designation has been added on the basis of the time information added to the moving image data.

The third control unit 133 performs control of the third communication unit 131 such that it transmits the divided data read from the storage unit 132 to the information terminal 120.

In addition, the third control unit 133 performs control of the third communication unit 131 such that it reads divided data following the divided data requested in the data transmission request information from the storage unit 132 in order of a time series and transmits the read divided data to the information terminal 120 in order of a time series. The third control unit 133 reads and transmits the following divided data from the storage unit 132 even in a case in which there is no next data transmission request information from the information terminal 120.

In a case in which there is switching request information for requesting to switch divided data from the information terminal 120, the third control unit 133 performs control such that other divided data based on other moving image data other than the transmitted divided image is read from the storage unit 132 in order of a time series. More specifically, the third control unit 133 performs control such that other divided data that is continuous in time to the divided data at a timing at which the switching request information is present is sequentially read from the storage unit 132. The third control unit 133 performs control of the third communication unit 131 such that it transmits the read other divided data to the information terminal 120.

The switching request information is an information signal for requesting to switch divided data based on the moving image data generated by one imaging apparatus 110, which is transmitted from the server 130 to the information terminal 120, to other divided data based on other moving image data generated by other imaging apparatus 110 other than the one imaging apparatus 110 and to transmit the other divided data from the server 130 to the information terminal 120.

As one example, in a case in which the switching request information is a request for switching from a moving image imaged by one imaging apparatus 110 to a moving image imaged by another other imaging apparatus 110 disposed next to the one imaging apparatus 110 on the right side, the divided data is stored in the storage unit 132 in association with the identification data as described above, and accordingly, the third control unit 133 reads the requested other divided data from the storage unit 132 on the basis of the association.

In this case, the third control unit 133 reads other divided data from the storage unit 132 such that imaging times of the divided data and the other divided data are continuous or almost continuously in time at the timing of switching from the divided data to the other divided data.

FIGS. 14A to 14D each are a diagram illustrating switching of divided data. Here, FIG. 14A is a diagram illustrating divided data, FIG. 14B is a first diagram illustrating switching of divided data, and FIG. 14C is a second diagram illustrating switching of divided data.

As illustrated in FIG. 14A as one example, divided data D2-A1, D2-A2, D2-A3, D2-A4, . . . acquired by dividing moving image data A and divided data D2-B1, D2-B2, D2-B3, D2-B4, . . . acquired by dividing moving image data B are respectively configured by frames acquired through imaging at the same or almost the same imaging time.

In an embodiment, divided data acquired by dividing the moving image data A and divided data acquired by dividing the moving image data B may be imaged at different imaging times.

As illustrated in FIG. 14B as one example, in a case in which a switching request signal S has been accepted after sequentially transmitting divided data D2-A1 and D2-A2 based on the moving image data A, the third control unit 133 reads divided data D2_B3 that is next to the divided data D2-A2 in time from the storage unit 132.

In addition, the third control unit 133 sequentially reads divided data D2-D4 that is later than the divided data D2-B3 in time from the storage unit 132. Alternatively, as illustrated in FIG. 14C as one example, in a case in which a switching request signal S has been accepted after sequentially transmitting the divided data D2-A1 and D2-A2 based on the moving image data A, the third control unit 133 reads divided data D2-B2 of which a timing is the same as that of the divided data D2-A2 in time from the storage unit 132. In addition, the third control unit 133 sequentially reads divided data D2-B3, D2-B4, . . . that are later than the divided data D2-B2 in time from the storage unit 132.

Since time information has been added to the moving image data in the imaging apparatus 110, the third control unit 133 can read divided data and other divided data continuously or almost continuously in time on the basis of the time information. Alternatively, even in a case in which time information has not been added to moving image data, the third control unit 133 acquires a reproduction time from the start when a moving image is reproduced on the basis of divided data by the information terminal 120 and reads other divided data including a frame corresponding to the reproduction time of the divided data thereof from the storage unit 132, whereby the divided data and the other divided data can be read continuously or almost continuously in time.

As a specific example, in a case in which the information terminal 120 sequentially displays a moving image based on divided data corresponding to one imaging apparatus 110, when a swiping operation is performed from the right side to the left side on the display screen of the display unit 122, in order to request transmission of divided data generated from moving image data imaged by another imaging apparatus 110 disposed on the right side of one imaging apparatus 110 that has generated moving image data that becomes a source of one piece of divided data, the second control unit 123 performs control such that switching request information is transmitted to the server 130.

When the switching request information is received, the third control unit 133 of the server 130 specifies another imaging apparatus 110 on the basis of identification data added to the moving image data, reads other moving image data imaged by another imaging device 110 that has been specified in units of divided data in the order of a time series from the storage unit 132, and performs control such that the moving image data is sequentially transmitted to the information terminal 120 as other divided data. Here, in the switching request information, by including identification data in the divided data received by the information terminal 120, the information terminal 120 may be configured to be able to designate another imaging apparatus 110, or another imaging apparatus 110 may be specified on the basis of the identification information added to the moving image data stored by the server 130.

When other divided data is received, the information terminal 120 displays a moving image based on the other divided data on the display unit 122.

During the transmission of divided data, in a case in which there is transmission stop request information requesting stop of the transmission of divided data from the information terminal 120, the third control unit 133 performs control of the third communication unit 131 such that it stops the transmission of the divided data. The transmission stop request information is an information signal for requesting to stop the transmission of divided data transmitted from the server 130 to the information terminal 120. In this case, the third control unit 133 reads other divided data that is based on one or a plurality of pieces of moving image data other than the divided data that is being transmitted and has the same timing as a timing at which the divided data is stopped in a time series from the storage unit 132 and performs control of the third communication unit 131 such that it transmits the read other divided data.

In a case in which the divided data based on the moving image data generated by one imaging apparatus 110 is controlled to be transmitted, when transmission stop request information is received from the third communication unit 131, the third control unit 133 stops the reading of divided data from the storage unit 132 and performs control of the third communication unit 131 such that it stops the transmission of the divided data thereof to the information terminal 120. The third control unit 133 reads other divided data based on the moving image data imaged by one or a plurality of other imaging apparatuses 110 from the storage unit 132 and performs control of the third communication unit 131 such that it transmits the read other divided data to the information terminal 120. In this case, the third control unit 133 reads other divided data to which time information that is the same as or almost the same as time information added to the divided data that has been transmitted last.

For example, if described with reference to FIG. 14A, when transmission stop request information is received after transmission of divided data D2-A2 based on moving image data A, the third control unit 133 performs control such that, after divided data D2-B2 or divided data D2-B3 based on moving image data B is transmitted, the transmission of the divided data is stopped.

In addition, in a case in which time information has not been added to the moving image data in the imaging apparatus 110, the third control unit 133 specifies other divided data that becomes a time corresponding to a reproduction time on the basis of the reproduction time when a moving image based on the divided data is reproduced by the information terminal 120 and reads the specified other divided data from the storage unit 132.

In addition, in a case in which there is transmission stop request information of the divided data from the information terminal 120 during the transmission of the divided data, the third control unit 133 performs control of the third communication unit 131 such that it transmits single-frame divided data closest to a time at which there is the transmission stop request information in time. In a case in which transmission stop request information has been received by the third communication unit 131, the third control unit 133 stops sequential reading of divided data in a time series. The third control unit 133 reads next or previous single-frame divided data in a time series from the timing at which the sequential reading of divided data in a time series was stopped from the storage unit 132 and performs control of the third communication unit 131 such that it transmits the read single-frame divided data to the information terminal 120.

For example, if described with reference to FIG. 13D, in a case in which there is a transmission stop request in a case in which divided data D2 including frames F1 to F3 is transmitted, the third control unit 133 performs control such that single-frame divided data D2S including a frame F4 that is closest from the divided data D2 thereof in time is transmitted.

In addition, after performing control such that the transmission of divided data is stopped due to the presence of transmission stop request information from the information terminal 120, in a case in which there is switching request information from the information terminal 120, the third control unit 133 performs control such that other divided data based on one or a plurality of pieces of moving image data other than the divided data of which the transmission has been stopped is transmitted to the information terminal 120. In this case, the other divided data is other single-frame divided data having the same timing as the timing at which the divided data is stopped in a time series.

When transmission stop request information is received by the third communication unit 131, the third control unit 133 performs control such that the transmission of the divided data is stopped. Thereafter, when switching request information is received by the third communication unit 131 from the information terminal 120, the third control unit 133 reads other divided data based on other moving image data for which there has been the request from the storage unit 132 and performs control of the third communication unit 131 such that the read other divided data is transmitted to the information terminal 120. In this case, the third control unit 133 reads other divided data to which time information that is the same or almost the same as the time information added to divided data that has been transmitted last is added. In addition, in a case in which time information has not been added to moving image data in the imaging apparatus 110, the third control unit 133 specifies other divided data of a time corresponding to a reproduction time on the basis of the reproduction time at a time when a moving image based on divided data is reproduced by the information terminal 120 and reads the specified other divided data from the storage unit 132.

In a case in which a multiple-frame divided data is transmitted, when switching request information for requesting switching of divided data is present from the information terminal 120, the third control unit 133 reads single-frame divided data from the storage unit 132 and performs control of the third communication unit 131 such that it transmits the read single-frame divided data. In this case, the single-frame divided data is single-frame divided data that is closest from the transmitted multiple-frame divided data in time. Described in more details, the single-frame divided data is single-frame divided data generated from other moving image data other than moving image data that becomes a source of multiple-frame divided data.

In a case in which divided data is read in the order of a time series from the storage unit 132, and the read divided data is controlled to be sequentially transmitted to the information terminal 120, when switching request information is received by the third communication unit 131 at a timing at which multiple-frame divided data as divided data has been transmitted or is transmitted, the third control unit 133 reads single-frame divided data from the storage unit 132 and performs control of the third communication unit 131 such that it transmits the single-frame divided data to the information terminal 120.

In this case, the single-frame divided data read from the storage unit 132 is single-frame divided data generated from other moving image data other than the moving image data that becomes a source of transmitted multiple-frame divided data. In addition, the single-frame divided data is single-frame divided data that is closest in time from a timing at which the multiple-frame divided data is transmitted or has been transmitted. In addition, the single-frame divided data may be single-frame divided corresponding to a time immediately before or immediately after multiple-frame divided data that is the closest in time from a timing at which multiple-frame divided data is transmitted or has been transmitted or may be single-frame divided data corresponding to a time that is earlier or later than the multiple-frame divided data by several frames. The third control unit 133, as described above, can specify single-frame divided data to be read from the storage unit 132 on the basis of the time information added to the moving image data or a reproduction time based on the divided data.

In addition, as described above, in the information terminal 120, switching request information is generated on the basis of a swiping operation on the display unit 122. In a swiping operation performed in the information terminal 120, in a case in which a touch of a user's finger on the display unit 122 ends (in a case in which the finger is separated from the display unit 122) and in a case in which a touch of the user's finger on the display unit 122 stops (in a case in which the finger is not separated from the display unit 122), the third control unit 133 transmits only single-frame divided data (the original single-frame divided-data) based on the moving image data to the information terminal 120 on the basis of the switching request information. In addition, simultaneously with the transmission of the original single-frame divided data, the third control unit 133 reads divided data (other divided data) based on other moving image data from the storage unit 132. In a case in which an imaging time of other divided data read from the storage unit 132 becomes the same as (or close to) an imaging time of the original single-frame divided data that is continuously transmitted, the third control unit 133 performs switching from the original single-frame divided data to other divided data and transmits the other divided data to the information terminal 120.

In addition, in a case in which divided data is sequentially transmitted to the information terminal 120, when switching request information is received from the information terminal 120, the third control unit 133, simultaneously with continuously transmitting only single-frame divided data (original single-frame divided data) based on the moving image data that has been continuously transmitted to the information terminal 120, may also transmit multiple-frame divided data (other multiple-frame divided data) based on other moving image data of a previous time to the information terminal 120 in parallel with the original single-frame divided data. In this case, in a case in which an imaging time of the multiple-frame divided data that is being transmitted becomes the same as (or close to) an imaging time of the original single-frame divided data that has been continuously transmitted in parallel, the third control unit 133 may stop the transmission of the original single-frame divided data and continue to transmit the other multiple-frame divided data. In addition, the information terminal 120 displays an image based on the original single-frame divided data in the display unit and displays a moving image based on the other multiple-frame divided data when the reception of the single-frame divided data is stopped.

Next, a moving image distribution method will be described.

Figure 15:
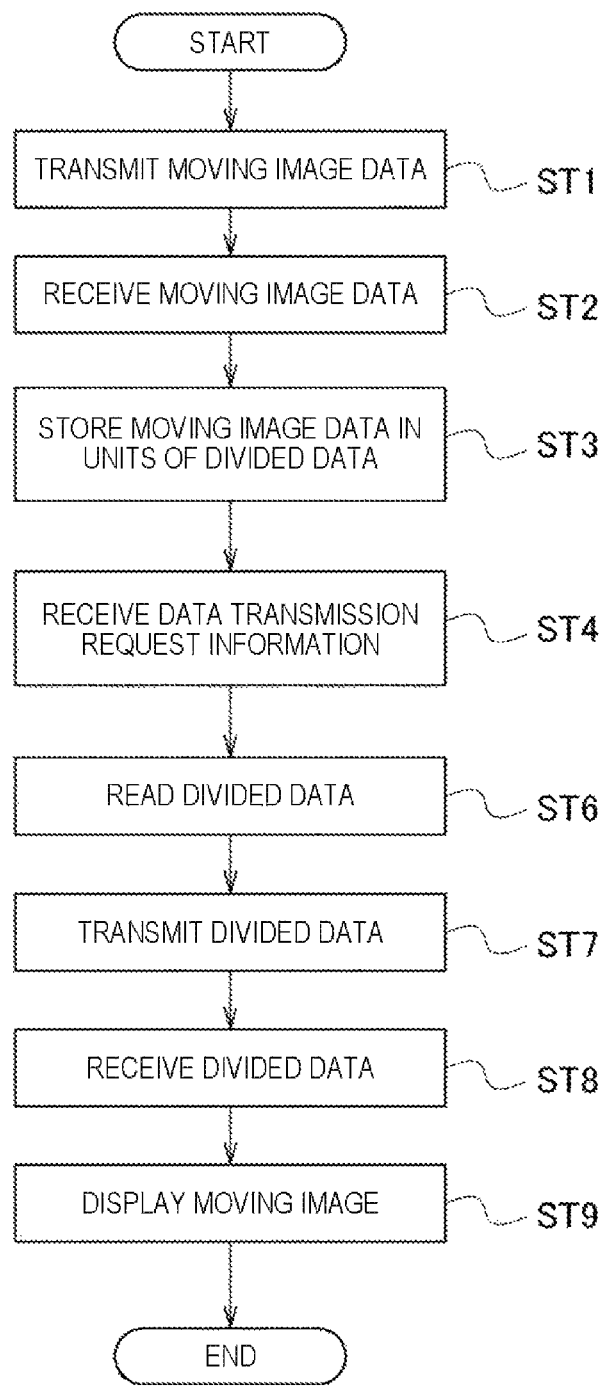
FIG. 15 is a flowchart illustrating a moving image distribution method.

FIG. 15 is a flowchart illustrating a moving image distribution method.

In step ST1, the plurality of imaging apparatuses 110, as an example, image the same subject from different angles, thereby generating moving image data. Each of the imaging apparatuses 110 transmits the generated moving image data to the server 130.

In step ST2, the server 130 receives the moving image data transmitted in step ST1.

In step ST3, the server 130 divides the moving image data received in step ST2 into one or more frames and stores the moving image data in units of divided data in the order of a time series.

In step ST4, the server 130 receives data transmission request information for requesting transmission of divided data from the external information terminal 120.

In step ST5, the server 130 reads the divided data stored in step S3 on the basis of the request information received in step ST4.

In step ST6, the server 130 transmits the divided data read in step ST5 to the information terminal 120 in the order of a time series.

In step ST7, the information terminal 120 sequentially receives the divided data transmitted in step ST6.

In step ST8, the information terminal 120 displays a moving image based on the divided data received in step ST7.

In this moving image distribution method, the server 130 may execute the processes of step ST2 to step ST6 using a program of a computer configuring this server 130.

Next, the operations of the server 130 will be described.

Figure 16:
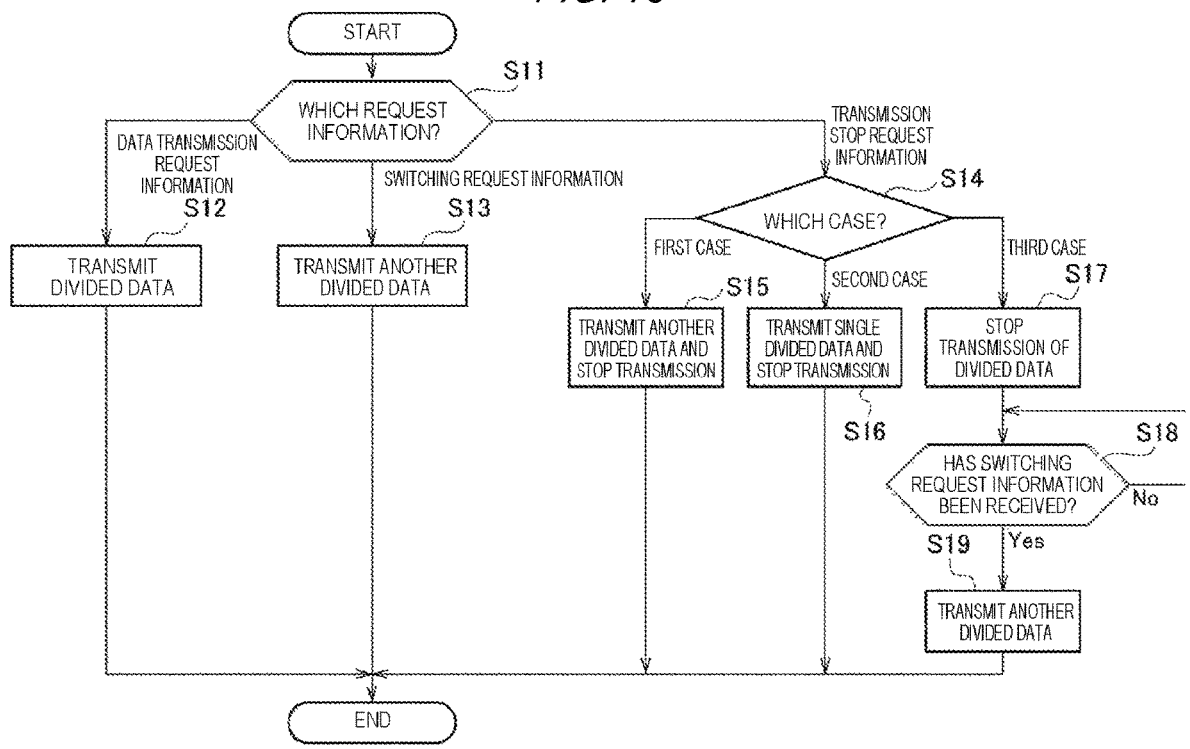
FIG. 16 is a flowchart illustrating operations of a server.

FIG. 16 is a flowchart illustrating the operations of the server.

In step S11, the server 130 (the third control unit 133) determines whether request information received by the third communication unit 131 is data transmission request information, switching request information, or transmission stop request information. In the case of the data transmission request information, the process proceeds to step S12. In the case of the switching request information, the process proceeds to step S13. In the case of the transmission stop request information, the process proceeds to step S14.

In step S12, the server 130 (the third control unit 133) sequentially transmits divided data.

In step S13, the server 130 (the third control unit 133) switches from the divided data to other divided data and transmits the other divided data. The server 130 (the third control unit 133) sequentially transmits succeeding other divided data. In addition, the server 130 (the third control unit 133) can transmit other single-frame divided data depending on the situation.

In step S14, the server 130 (the third control unit 133) determines one of first to third cases. For example, the first to third cases are determined on the basis of conditions set in advance. As one example, in a case in which the transmission stop request is received, the server 130 (the third control unit 133) executes the process of the first case in a case in which a condition set in advance is the first case.

In a case in which the first case is determined in step S14, the server 130 (the third control unit 133) transmits other divided data and stops the transmission of the divided data and the other divided data in step S15.

In a case in which the second case is determined in Step S14, the server 130 (the third control unit 133) transmits single-frame divided data and stops the transmission of data in step S16.

In a case in which the third case is determined in step S14, the server 130 (the third control unit 133) stops the transmission of the divided data in step S17.

In step S18, the server 130 (the third control unit 133) determines whether or not the switching request information has been received. In a case in which the switching request information has been received, the process proceeds to step S19. In a case in which the switching request has not been received, the process performs the determination of step S18 again.

In step S19, the server 130 (the third control unit 133) transmits other divided data.

Next, effects of the embodiment will be described.

The server 130 as a moving image distribution device is configured to include the storage unit 132 in which moving image data is stored in units of divided data acquired by dividing the moving image data into one or more frames in the order of a time series, the third communication unit 131 that receives data transmission request information from the external information terminal 120 and transmits divided data to the information terminal 120, and the third control unit 133 that reads divided data from the storage unit 132 on the basis of data transmission request information (request information) received by the third communication unit 131 and performs control of the third communication unit 131 such that it transmits the read divided data to the information terminal 120.

The server 130 as a moving image distribution device stores moving image data in units of divided data in the storage unit 132 and transmits the moving image data in units of the divided data thereof. By configuring data in units of divided data, as one example, in divided data composed of three frames and data in which there are three images composed of one frame, the divided data is compressed more, and the file size can be decreased. In accordance with this, the moving image distribution device can shorten a time required for data transmission more than in a conventional case.

In addition, the server 130 can allow the information terminal 120 to store data in the form of the divided data or to access in the form of the divided data, and accordingly, switching to other divided data can be easily performed. In other words, the server 130 can perform seamless switching from a moving image imaged by one imaging apparatus 110 to an image imaged by another imaging apparatus.

In addition, conventionally, in a case in which an ordinary moving image is transmitted to the information terminal, when the file volume is large to a certain degree, and the number of imaging apparatuses becomes larger, data needs to be read into the storage unit of the information terminal in advance, which is practically difficult. Furthermore, in a case in which a moving image is read from a local disk, the information terminal requires a time for reading and needs to seek until a switching time even after reading the moving image, and accordingly, it is difficult to perform seamless switching.

In a case in which any one of a plurality of pieces of divided data is requested to be transmitted in accordance with data transmission request information, the third control unit 133 of the moving image distribution device reads the requested divided data from the storage unit 132 and performs control such that the read divided data is transmitted to the information terminal 120. In this case, the third control unit 133 reads divided data succeeding the divided data requested in the data transmission request information in the order of a time series from the storage unit 132 and performs control such that the read divided data is transmitted to the information terminal 120 in the order of a time series.

In accordance with this, in a case in which divided data is transmitted, the server 130 as a moving image distribution device can decrease a load applied to the communication network N to be lower than that of a conventional case (a case in which an image composed of one frame is sequentially transmitted). In addition, in the information terminal 120 in which a moving image based on divided data is displayed, the load for receiving data can be lowered.

In a case in which there is switching request information, the third control unit 133 of the moving image distribution device sequentially reads other divided data that is based on other moving image data other than the divided data that is being transmitted and is continuous in time from the divided data at a timing at which there is the switching request information from the storage unit 132 and performs control such that the read other divided data is transmitted.

The server 130 as the moving image distribution device transmits moving image data in units of divided data to the information terminal 120 and thus can instantly switch from one divided data to other divided data and transmit the other divided data to the information terminal 120. In accordance with this, after transmitting the switching request information to the server 130, the information terminal 120 does not need to wait for the completion of download of all the data that has been received until now. In other words, the information terminal 120 can instantly switch from a moving image based on divided data to a moving image based on other divided data can be performed.

In a case in which there is transmission stop request information during the transmission of divided data, the third control unit 133 of the moving image distribution device performs control such that the transmission of the divided data is stopped. In this case, the third control unit 133 reads other divided data that is based on one or a plurality of pieces of other moving image data other than the divided data that is being transmitted and has the same timing in a time series as a timing at which the divided data is stopped from the storage unit 132 and performs control such that the read other divided data is transmitted.

In accordance with this, the information terminal 120 downloads divided data and the other divided data and accordingly, switching between an image based on the divided data and an image based on the other divided data can be performed by performing only an operation in the information terminal 120.

In the server 130 as a moving image distribution device, divided frames are composed of multiple-frame divided data composed of a plurality of frames and single-frame divided data composed of one frame. In this case, the multiple-frame divided data and the single-frame divided data are configured to be alternately arranged in a time series. In the information terminal 120 to which divided data is transmitted, by arranging single-frame divided data, for example, switching from a moving image displayed on the basis of one divided data to a moving image data displayed on the basis of other divided data can be easily performed.

In the server 130 as a moving image distribution device, a plurality of pieces of single-frame divided data may be continuously arranged in a time series. In such a case, one multiple-frame divided data and a plurality of pieces of single-frame divided data are configured to be alternately arranged in a time series. In the information terminal 120 to which divided data is transmitted, by arranging a plurality of pieces of single-frame divided data, for example, switching from a moving image displayed on the basis of one divided data to a moving image data displayed based on other divided data can be performed more easily.

In a case in which there is transmission stop request information during transmission of divided data, the third control unit 133 of the moving image distribution device performs control such that single-frame divided data closest in time from a time at which there is the transmission stop request information is transmitted.

In accordance with this, since single-frame divided data is received, the information terminal 120 can check an image based on the single-frame divided data more easily than the case of a moving image. Furthermore, thereafter, even in a case in which other divided data is received on the basis of transmission of switching request information, the information terminal 120 can easily perform switching between images on the information terminal 120.

In a case in which there is switching request information after the transmission of divided data is controlled to be stopped in accordance with the presence of transmission stop request information, the third control unit 133 of the moving image distribution device performs control such that other single-frame divided data that is based on one or a plurality of pieces of other moving image data other than the divided data of which transmission has been stopped and has the same timing in a time series as a timing at which the divided data is stopped is transmitted to the information terminal 120.

In accordance with this, the information terminal 120 can display an image based on the single-frame divided data and can perform image switching. The moving image distribution device transmits one piece of other single-frame divided data, and accordingly, the amount of data to be transmitted can be smaller than that of a case in which multiple-frame divided data is transmitted.

In a case in which multiple-frame divided data is transmitted, when there is switching request information from the information terminal 120, the third control unit 133 of the moving image distribution device performs control such that single-frame divided data is transmitted. In this case, the single-frame divided data is single-frame divided data that is close in time from multiple-frame divided data to be transmitted and is generated from other moving image data other than the moving image data that becomes a source of the multiple-frame divided data.

In a case in which divided data that is being transmitted is to be switched to other divided data, the moving image distribution device transmits single-frame divided data close in time from the multiple-frame divided data, and accordingly, a moving image based on the divided data displayed in the information terminal 120 is not switched with being separated in time, and it can be inhibited to give a strange feeling to a user.

The moving image distribution system includes the plurality of imaging apparatuses 110 that generate moving image data by imaging a subject from different angles, the server 130 that stores divided data based on moving image data generated by the plurality of imaging apparatuses 110 and transmits the divided data, and the information terminal 120 that performs display on the basis of the divided data transmitted from the server 130. In this case, the server 130 includes the storage unit 132 that stores a plurality of pieces of moving image data in units of divided data acquired by dividing the moving image data into one or more frames in a time series, the third communication unit 131 that receives request information from the information terminal 120 and transmits the divided data to the information terminal 120, and the third control unit 133 that reads divided data on the basis of the request information received by the third communication unit 131 from the storage unit 132 and performs control of the third communication unit 131 such that it transmits the read divided data to the information terminal 120.

The server 130 of the moving image distribution system stores moving image data in units of divided data in the storage unit 132 and transmits the moving image data in units of divided data thereof. By configuring data in units of divided data, the data is compressed, and the file size can be decreased.

In a case in which divided data is transmitted, the server 130 of the moving image distribution system can decrease the load applied to the communication network to be lower than that of a conventional case. In addition, the information terminal 120 of the moving image distribution system can decrease the load for reception data.

The moving image distribution method includes a step of dividing a plurality of pieces of moving image data acquired by imaging a subject from different angles into one or more frames and storing the moving image data in units of divided data in a time series, a step of receiving data transmission request information (request information) from the external information terminal 120, a step of reading divided data on the basis of the received data transmission request information, and a step of transmitting the read divided data to the external information terminal 120.

The moving image distribution method stores moving image data in the storage unit 132 in units of divided data and transmits the moving image data in units of the divided data thereof. By configuring data in units of divided data, the data is compressed, and the file sized can be decreased.

The moving image distribution program causes a computer to execute a step of dividing a plurality of pieces of moving image data acquired by imaging a subject from different angles into one or more frames and storing the moving image data in units of divided data in a time series, a step of receiving request information from the external information terminal 120, a step of reading divided data on the basis of the received data transmission request information (request information), and a step of transmitting the read divided data to the external information terminal 120.

The moving image distribution program stores moving image data in units of divided data in the storage unit 132 and transmits the moving image data in units of the divided data thereof. By configuring data in units of divided data, the data is compressed, and the file size can be decreased.

Hereinafter, a modified example will be described.

In a case in which divided data is transmitted to the information terminal 120, when there is a switching request from the information terminal 120, the third control unit 133 may further divide one piece of divided data into a plurality of pieces of divided data at a timing at which there is the switching request. As one example, in a case in which divided data C composed of six frames is transmitted to the information terminal 120, when there is a switching request, the third control unit 133 may divide the divided data C stored in the storage unit 132 into divided data C1 composed of three frames of the first half in the order of a time series and divided data C2 composed of three frames of the second half in the order of the time series. In addition, the number of frames is not limited to that of the example described above. In addition, in a case in which the same moving image data is transmitted in units of divided data a plurality of numbers of times, when there is a plurality of switching requests at the same timing, one piece of divided data corresponding to the timing at which there is the switching request may be divided into a plurality of pieces of divided data.

In the embodiment described above, an example in which divided data is generated by dividing moving image data into one or more frames in the order of a time series has been described. However, the present invention is not limited to this example. Thus, a plurality of frames configuring moving image data may be sequentially selected at arbitrary timings in a time series, and divided data may be generated from the selected frames.

In the embodiment described above, an example in which moving image data is transmitted from the imaging apparatus 110 to the server 130 has been described. However, the present invention is not limited to this example. Thus, it may be configured such that moving image data generated by imaging a subject using the imaging apparatus 110 is temporarily stored in a memory or the like, the memory and the server 130 are connected after the completion of the imaging, and the moving image data is moved from the memory to the server 130.

In addition, various changes are also included in a range not departing from the concept of the present invention. Furthermore, the configurations of the embodiments described above may be appropriately combined.

REFERENCE SIGNS LIST

1 Image distribution system
10 Mobile terminal
20 Image distribution device
21 Acquisition unit
22 Data generating unit
23 Designated value accepting unit
24 Selection unit
25 Storage unit
30 Information processing terminal
33 CPU (requesting unit)
35 Drawing LSI (drawing unit)
38 Operation recognizing unit
40 User
O Subject
100 Moving image distribution system
110 Imaging apparatus
120 Information terminal
130 Server

The invention claimed is:
1. An image distribution device comprising:
an acquisition unit that acquires a plurality of pieces of moving image data imaged at different points;
a data generating unit that generates still image data by extracting a frame for every predetermined time as a still image for each of the plurality of pieces of moving image data acquired by the acquisition unit;
a storage unit that stores the still image data in association with position data representing an imaging position at which a subject has been imaged in each of the plurality of pieces of moving image data and time data representing a time at which the still image data has been imaged;

a designated value accepting unit that accepts a position designation value for designating the position data in the still image data desired to be viewed by a user; and a selection unit that selects the still image data in accordance with the time data on the basis of the position designation value accepted by the designated value accepting unit and transmits the selected still image data to an external display device via a communication network, wherein the selection unit selects the still image data corresponding to the position designation value that has already been designated in a case in which the designated value accepting unit has not accepted the position designation value and selects the corresponding still image data on the basis of a change in the position designation value by using the time data of the still image data corresponding to a time at which the position designation value has been accepted as a reference in a case in which the designated value accepting unit has accepted the position designation value.

2. The image distribution device according to claim 1, wherein, when the time data is used as a reference, the selection unit initially selects the still image data corresponding to the position data selected at that moment.

3. The image distribution device according to claim 1,
wherein the acquisition unit acquires a plurality of pieces of moving image data acquired by imaging a subject from different directions,
wherein the position data is direction data representing information that can be used for specifying a direction in which the subject is imaged, and
wherein the designated value accepting unit accepts a direction designation value for designating the direction data in the still image data desired to be viewed by the user as the position designation value.

4. An image distribution system comprising:
the image distribution device according to claim 3; and
a plurality of mobile terminals that are arranged to surround a subject, include cameras imaging the subject from different directions, have a function of recording moving images acquired through imaging, transmit the recorded moving images to a communication network, and configure a plurality of imaging units,
wherein the acquisition unit acquires a plurality of the moving images acquired by the mobile terminals imaging the subject from the mobile terminals via the communication network.

5. The image distribution system according to claim 4, further comprising
an information processing terminal that includes a display monitor receiving and displaying the still image data transmitted from the image distribution device and an operation recognizing unit recognizing a motion of a finger of a user in front of the display monitor as a direction designating operation for selecting the direction designation value and recognizing an amount of movement of the finger of the user as the direction designation value and configures the display device,
wherein the information processing terminal, by using the still image data received from the selection unit, displays the still image data of the subject at the direction designation value changing on the basis of the direction designating operation during the direction designating operation and displays a pseudo moving image from a direction corresponding to a completion position by sequentially receiving and displaying the still image data having a direction designation value corresponding to the completion position of the direction designating operation in the order of a time series when the direction designating operation is not performing.

6. The image distribution system according to claim 5, wherein the operation recognizing unit recognizes a swiping operation in which a user slides a finger in a state in which the finger is brought into contact with a surface of the display monitor as the direction designating operation.

7. The image distribution system according to claim 6, wherein, in a case in which the designated value accepting unit accepts the direction designation value, the selection unit selects the still image data such that the direction data is continuously connected in a case in which the amount of change in the direction designation value per unit time is smaller than a threshold and selects the still image data such that the direction data is intermittently connected in a case in which the amount of change in the direction designation value per unit time is equal to or larger than the threshold.

8. The image distribution system according to claim 7,
wherein the information processing terminal includes a requesting unit that makes a request to the selection unit for the still image data to be displayed on the display monitor on the basis of the direction designation value and a drawing unit that draws the still image data acquired by the requesting unit in the display monitor using Hyper Text Markup Language (HTML) data, and
wherein a time TF in which the drawing unit draws the still image data on the display monitor is shorter than a time TD in which the requesting unit acquires the still image data from the selection unit and transmits the acquired still image data to the drawing unit.

9. An image distribution method causing a computer to execute:
an acquisition step of acquiring a plurality of pieces of moving image data imaged at different points;
a data generating step of generating still image data by extracting a frame for every predetermined time as a still image for each of the plurality of pieces of moving image data acquired in the acquisition step;
a storage step of storing the still image data in association with position data representing an imaging position at which a subject has been imaged in each of the plurality of pieces of moving image data and time data representing a time at which the still image data has been imaged;
a designated value accepting step of accepting a position designation value for designating a position at which the subject is viewed by a user; and
a selection step of selecting the still image data in accordance with the time data on the basis of the position designation value accepted in the designated value accepting step and transmitting the selected still image data to an external display device via a communication network,
wherein, in the selection step, the still image data corresponding to the position designation value that has already been designated is selected in a case in which the position designation value has not been accepted in the designated value accepting step, and the corresponding still image data is selected on the basis of a change in the position designation value by using the time data of the still image data corresponding to a time at which the position designation value has been accepted as a reference in a case in which the position designation value has been accepted in the designation value accepting step.

10. A non-transitory computer readable medium comprising stored instructions, which when executed by a processor, cause the processor to:
- acquire a plurality of pieces of moving image data imaged at different points;
- generate still image data by extracting a frame for every predetermined time as a still image for each of the plurality of pieces of moving image data;
- store the still image data in association with position data representing an imaging position at which a subject has been imaged in each of the plurality of pieces of moving image data and time data representing a time at which the still image data has been imaged;
- accept a position designation value for designating a position at which the subject is viewed by a user;
- select the still image data in accordance with the time data on the basis of the position designation value; and
- transmit the selected still image data to an external display device via a communication network,
- wherein the still image data corresponding to the position designation value that has already been designated is selected in a case in which the position designation value has not been accepted, and the corresponding still image data is selected on the basis of a change in the position designation value by using the time data of the still image data corresponding to a time at which the position designation value has been accepted as a reference in a case in which the position designation value has been accepted.

* * * * *